United States Patent
Shin et al.

(10) Patent No.: US 11,302,031 B2
(45) Date of Patent: Apr. 12, 2022

(54) SYSTEM, APPARATUS AND METHOD FOR INDOOR POSITIONING

(71) Applicant: LG Electronics Inc., Seoul (KR)

(72) Inventors: Dong Heon Shin, Seoul (KR); Geong Hwan Yu, Gyeonggi-do (KR); Hyun Soo Kim, Seoul (KR); Hyun Sang Park, Seoul (KR); Tae Kwon Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/744,973

(22) Filed: Jan. 16, 2020

(65) Prior Publication Data

US 2021/0104064 A1 Apr. 8, 2021

(30) Foreign Application Priority Data

Oct. 7, 2019 (KR) ........................ 10-2019-0123910

(51) Int. Cl.
*G06K 9/00* (2006.01)
*G06T 7/73* (2017.01)
*G06K 9/32* (2006.01)

(52) U.S. Cl.
CPC ................ *G06T 7/74* (2017.01); *G06K 9/325* (2013.01); *G06T 2207/20081* (2013.01); *G06T 2207/20084* (2013.01); *G06T 2207/30252* (2013.01)

(58) Field of Classification Search
CPC .......... G06K 9/325; G06T 2207/10016; G06T 2207/20081; G06T 2207/20084; G06T 2207/30244; G06T 2207/30252; G06T 2207/30264; G06T 7/74

See application file for complete search history.

(56) References Cited

U.S. PATENT DOCUMENTS

| 2013/0163879 | A1* | 6/2013 | Katz | G06T 7/254 |
| | | | | 382/195 |
| 2018/0225524 | A1* | 8/2018 | Fujita | G06T 7/246 |
| 2021/0011483 | A1* | 1/2021 | Li | G05D 1/0246 |

FOREIGN PATENT DOCUMENTS

| KR | 10-1782057 | 9/2017 |
| KR | 10-2019-0098927 | 8/2019 |

* cited by examiner

*Primary Examiner* — Xin Jia
(74) *Attorney, Agent, or Firm* — Fish & Richardson P.C.

(57) ABSTRACT

The present disclosure relates to an indoor positioning method for operating an indoor positioning system and an indoor positioning apparatus by executing an artificial intelligence (AI) algorithm and/or a machine learning algorithm in a 5G environment connected for the Internet of Things. The indoor positioning method according to an embodiment of the present disclosure includes receiving map data and map information data of an indoor map in response to a presence of the indoor map of an indoor space, acquiring an image of the indoor space at a device camera, comparing image information of the indoor map with the acquired image information of the indoor space based on the map data and the map information data of the indoor space, and performing indoor localizing of the indoor space based on a result of the comparing.

7 Claims, 17 Drawing Sheets

SYSTEM, APPARATUS AND METHOD FOR INDOOR POSITIONING

CROSS-REFERENCE TO RELATED APPLICATION

This application claims benefit of priority to Korean Application No. 10-2019-0123910, filed on Oct. 7, 2019, the entire disclosure of which is incorporated herein by reference.

BACKGROUND

1. Technical Field

The present disclosure relates to a system, an apparatus, and a method for indoor positioning; and, more particularly, to a system, an apparatus, and a method for indoor positioning which can perform indoor localizing based on an image corrected by matching a field of view (FOV) of a camera of an indoor positioning vehicle with an FOV of a camera of a map creation vehicle.

2. Description of Related Art

In general, simultaneous localization and mapping (SLAM), which is mainly used for autonomous driving of examples such as a mobile robot, is a technology that recognizes a position using a map of a neighboring environment, or creates a map of a corresponding area by recognizing a position, or performs position recognition and map creation at the same time.

Related Art 1 discloses a method allowing a robot to select a camera sensor position suitable for improving accuracy in estimating a position, and providing hardware components that allow camera sensors to move so as to test various camera positions suitable for execution of visual SLAM by the robot.

Related Art 2 discloses a method for performing map creation and position recognition in real time while storing image data in a period where uncertainty of a map may increase due to, for example, drastic camera movement, and creating an accurate complete map using the stored image data and the created map.

In other words, Related Art 1 is characterized in that the camera sensor positions suitable for characteristics of a space are determined by evaluating the images captured by the camera sensors, and the performance of the visual SLAM is improved based on the determined camera sensor positions. Related Art 2 is characterized in that an accurate map can be created using the images captured during the movement of the image capturer even when an orientation of the device such as the camera is drastically changed. In other words, the optimal SLAM can be performed by setting and controlling the cameras in Related Arts 1 and 2. However, Related Arts 1 and 2 has disadvantages in that the accuracy of examples such as indoor positioning and SLAM map updating may deteriorate since there is no process of matching images based on FOV information of the camera that has created the pre-created SLAM map when the examples such as the indoor positioning and the SLAM map updating are performed using the pre-created SLAM map. In other words, image-based SLAM is performed using features, such as points and lines, of an image and if there is an FOV difference between the camera that has created the SLAM map and the camera that performs the positioning, it is difficult to perform an accurate SLAM due to an image input difference.

The above-described background technology is technical information that the inventors have held for the derivation of the present disclosure or that the inventors acquired in the process of deriving the present disclosure. Thus, the above-described background technology cannot be regarded as known technology disclosed to the general public prior to the filing of the present application.

(Related Art 1) Korean Patent Application Publication No. 10-2019-0098927 (published on Aug. 23, 2019)

(Related Art 2) Korean Patent No. 10-1782057 (issued on Sep. 20, 2017)

SUMMARY OF THE INVENTION

An object of the present disclosure is to perform indoor localizing based on an image corrected by matching a field of view (FOV) of a camera of an indoor positioning vehicle with an FOV of a camera of a map creation vehicle.

An object of the present disclosure is to solve an issue in which it is difficult to perform an accurate SLAM due to an input difference with an image of the camera of the map creation vehicle when there is an FOV value difference.

An object of the present disclosure is to allow various cameras to perform indoor localizing using a pre-created SLAM map.

An object of the present disclosure is to obtain a conversion formula for calculating an FOV by extracting image features from the camera images of the map creation vehicle and those of the indoor positioning vehicle.

An object of the present disclosure is to facilitate navigation in an indoor space by sharing indoor positioning information through a resource sharing network.

The present disclosure is not limited to what has been described above, and other aspects not mentioned herein will be apparent from the following description to one of ordinary skill in the art to which the present disclosure pertains. Furthermore, it will be understood that aspects and advantages of the present disclosure may be achieved by the means set forth in claims and combinations thereof.

The indoor positioning method according to an embodiment of the present disclosure may include a step of performing indoor localizing based on an image corrected by matching a field of view (FOV) of a camera of an indoor positioning vehicle with an FOV of a camera of a map creation vehicle.

Specifically, the indoor positioning method according to an embodiment of the present disclosure may include: checking entry into an indoor space; checking presence of an indoor map of the indoor space in response to checking the entry; receiving map data and map information data of the indoor map in response to the presence of the indoor map of the indoor space; acquiring an image of the indoor space at a device camera; comparing image information of the indoor map with the acquired image information of the indoor space based on the map data and the map information data of the indoor map; and performing indoor localizing of the indoor space based on a result of the comparing.

In the indoor positioning method according to an embodiment of the present disclosure, the indoor localizing is performed by matching an image of a map creation camera and an image of an indoor positioning camera based on FOV value and thus, the accuracy of the indoor localizing can be improved.

Further, the indoor positioning method according to an embodiment of the present disclosure may include: receiving the map information data including at least one of information on a camera of a device that has created the indoor map, or parameters for comparing a reference image with the acquired image of the indoor space.

In the indoor positioning method according to an embodiment of the present disclosure, various cameras can perform the indoor localizing using the pre-created SLAM map and thus, the performance of the indoor positioning system can be improved.

Further, the indoor positioning method according to an embodiment of the present disclosure may include: checking presence of information on the device camera in the map information data; and acquiring a field of view (FOV) value of the acquired image.

Further, the indoor positioning method according to an embodiment of the present disclosure may include: checking presence of information on the device camera in the map information data; and acquiring a comparative image captured at a position corresponding to the position where the reference image is captured, in response to the checking the presence of the information on the device camera in the map information data.

In the indoor positioning method according to an embodiment of the present disclosure, the image input difference between the map creation camera and the indoor positioning camera due to an FOV difference is eliminated and thus, error of the SLAM result can be reduced.

Further, the indoor positioning method according to an embodiment of the present disclosure may include: extracting features of the reference image and features of the acquired comparative image; obtaining a conversion formula for converting a feature point coordinate system of the reference image to a feature point coordinate system of the acquired comparative image; and calculating an FOV value of the acquired comparative image based on the conversion formula.

Further, the indoor positioning method according to an embodiment of the present disclosure may include: matching the reference image with the acquired comparative image using a deep neural network model that is trained for image matching; obtaining a domain conversion formula of the acquired comparative image by projecting on a map domain a result of the matching the reference image and the acquired comparative image using the deep neural network model that is trained for image matching; and calculating an FOV value of the acquired comparative image based on the conversion formula, wherein the deep neural network model is a learning model that is trained for matching the reference image with the acquired comparative image while using parameters of the reference image and parameters of the acquired comparative image as input data.

In the indoor positioning method according to an embodiment of the present disclosure, the matching image is captured at a position closest to the position where the reference image was captured. Accordingly, the accuracy of the image matching can be improved, and the indoor localizing technology can be refined.

Further, the indoor positioning method according to an embodiment of the present disclosure may further include, after the comparing the image information of the indoor map with the acquired image information: correcting the acquired image to correspond to the image of the indoor map based on the FOV value of the acquired image.

In the indoor positioning method according to an embodiment of the present disclosure, the position can be accurately recognized even in, for example, a space where a satellite signal does not reach or an underground parking space. Accordingly, product reliability of the indoor positioning system can be improved.

An indoor positioning apparatus according to an embodiment of the present disclosure includes: a map information receiver configured to check presence of an indoor map of the indoor space in response to checking entry into the indoor space, and receive map data and map information data of the indoor map in response to the presence of the indoor map of the indoor space; an image receiver configured to acquire an image of the indoor space at a device camera; a matching executor configured to compare image information of the indoor map with the acquired image information of the indoor space based on the map data and the map information data of the indoor space; and a positioning executor configured to execute indoor localizing of the indoor space based on a result of the comparing.

The map information data may include at least one of information on a camera of a device that has created the indoor map, or parameters for comparing a reference image with the acquired image of the indoor space.

By using the indoor positioning apparatus according to an embodiment of the present disclosure, the indoor positioning is performed by matching the image of the map creation camera with the image of the indoor positioning camera based on an FOV value of the camera and thus, the accuracy of the indoor positioning can be improved.

Further, the matching executor may include: a comparative image receiver configured to acquire a comparative image captured at a position corresponding to a position where the reference image is captured, in response to an absence of the information on the camera of the device in the map information data.

Further, the matching executor may further include: a feature extractor configured to extract features of the reference image and features of the acquired comparative image; and an FOV calculator configured to obtain a conversion formula for converting a feature point coordinate system of the reference image to a feature point coordinate system of the acquired comparative image and calculate an FOV value of the acquired comparative image based on the conversion formula.

Further, the matching executor further includes: matching the reference image with the acquired comparative image using a deep neural network model that is trained for image matching; and an FOV calculator configured to obtain a domain conversion formula of the acquired comparative image by projecting, on a map domain, a result of the matching the reference image with the acquired comparative image using the deep neural network model that is trained for image matching, and calculate an FOV value of the acquired comparative image based on the conversion formula. Herein the deep neural network model is a learning model that is trained for matching the reference image with the acquired comparative image while using parameters of the reference image and parameters of the acquired comparative image as input data.

By using the matching executor according to an embodiment of the present disclosure, the conversion formula for calculating an FOV is obtained by extracting the features of the image of the camera of the map creation vehicle and the features of the image of the camera of the indoor positioning vehicle and thus, various cameras can perform the indoor positioning using the pre-created SLAM map.

Further, the indoor positioning apparatus according to an embodiment of the present disclosure may further include: a corrector configured to correct, after the image information of the indoor map and the acquired image information are compared, the acquired image to be correspond to the image of the indoor map based on the FOV value of the acquired image.

The indoor positioning system according to an embodiment of the present disclosure includes: server for positioning based on a SLAM map comprising, a processor; and a memory operatively coupled with the processor, wherein the processor is configured to allow a first vehicle to perform indoor localizing of an indoor space based on an image of the indoor space received from a vehicle camera of the first vehicle, to check presence of an indoor map of the indoor space, and to compare image information of the first vehicle with image information of a second vehicle based on map data and map information data of the indoor space, wherein the second vehicle is a vehicle that has originally created the indoor map. The map information data includes at least one of information on a camera of a vehicle that has created the indoor map, or parameters for comparing a reference image with the image of the first vehicle.

By using the indoor positioning system according to an embodiment of the present disclosure, the image input difference between the map creation camera and the indoor positioning camera due to the FOV difference is eliminated and thus, the error of the SLAM result can be reduced. Accordingly, the product reliability can be improved.

Further, the processor is configured to check presence of information on the camera of the first vehicle in the map information data, receive a comparative image captured by the first vehicle at a position corresponding to a position where the reference image was captured by the second vehicle, in response to the checking presence of information on the vehicle camera of the first vehicle in the map information data, and calculate an FOV value of the comparative image based on a result of matching the reference image with the comparative image. The processor corrects, after the image information acquired from the second vehicle and the image information acquired from the first vehicle are compared, the image of the first vehicle to correspond to the image of the second vehicle based on the FOV value included in the image information received from the first vehicle.

Further, the processor is configured to extract features of the reference image of the second vehicle and features of the comparative image of the first vehicle, obtain a conversion formula for converting a feature point coordinate system of the reference image of the second vehicle to a feature point coordinate system of the comparative image of the first vehicle, and calculates an FOV value of the acquired comparative image based on the conversion formula.

Further, the processor is configured to match the reference image of the second vehicle with the comparative image of the first vehicle using a deep neural network model that is trained for image matching, obtain a domain conversion formula of the comparative image by projecting, on a map domain, a result of the matching the reference image with the comparative image using the deep neural network model that is trained for image matching, and calculate an FOV value of the comparative image based on the conversion formula. The deep neural network model is a learning model that is trained to match the reference image with the comparative image while using parameters of the reference image and parameters of the comparative image as input data.

By using the server according to an embodiment of the present disclosure, the conversion formula for calculating the FOV is obtained by extracting the features of the image of the camera of the map creation vehicle and the features of the image of the camera of the indoor positioning vehicle and thus, various cameras can perform the indoor positioning using the pre-created SLAM map.

Further, the processor is configured to update the conversion formula obtained based on a result of matching the image information of the first vehicle and the image information of the second vehicle, the information on the camera of the first vehicle, and indoor positioning data of the first vehicle.

Further, the processor is configured to receive image information of the second vehicle from an indoor space camera which is disposed in the indoor space and configured to capture image information including an image of a license plate of a vehicle entering the indoor space, receive image information of the first vehicle at a position corresponding to a position where the image of the second vehicle is captured, and receive an image of the indoor space from the first vehicle captured at a position where an image size of a license plate of the first vehicle matches an image size of a license plate of the second vehicle.

In the indoor positioning system according to an embodiment of the present disclosure, the image for matching is captured at a position closest to the position where the reference image was captured, by utilizing a license plate recognition system. Therefore, the accuracy and the performance of the indoor positioning system can be improved.

Further, the processor is configured to obtain position information of one or more vehicles located in the indoor space based on indoor positioning information created for the indoor space.

By using the server according to an embodiment of the present disclosure, navigation can be facilitated in the indoor space by sharing the indoor positioning information through the resource sharing network. Accordingly, the applicability and the efficiency of the indoor positioning system can be improved.

In addition, in order to implement the present disclosure, there may be further provided other methods, other systems, and a computer-readable recording medium having a computer program stored thereon to execute the methods.

Other aspects and features as well as those described above will become clear from the accompanying drawings, the claims, and the detailed description of the present disclosure.

In accordance with an embodiment of the present disclosure, the accuracy of the indoor positioning can be improved by performing the indoor positioning based on the image corrected by matching the FOV of the camera of the indoor positioning vehicle with the FOV of the camera of the map creation vehicle.

Further, the image input difference between the map creation camera and the indoor positioning camera due to an FOV difference is eliminated to reduce error of the SLAM result. Accordingly, the product reliability can be improved.

Further, various cameras can perform the indoor positioning using the pre-created SLAM map by obtaining a conversion formula for calculating an FOV by extracting the image features from the image of the camera of the map creation vehicle and the image features from the image of the camera of the indoor positioning vehicle.

Further, by capturing the image for matching at a position closest to a position where the reference image was captured, the accuracy of the image matching can be improved, and the indoor positioning technique can be refined.

In addition, the product reliability of the indoor positioning system can be improved by allowing a position to be accurately recognized in, for example, a space where a satellite signal does not reach or an underground parking space.

Further, the applicability and the efficiency of the indoor positioning system can be improved by allowing navigation in the indoor space by sharing the indoor positioning information through the resource sharing network.

Further, the data can be quickly processed by performing the indoor positioning through 5G network-based communication. Accordingly, the performance of the indoor positioning system can be further improved.

Although the indoor positioning apparatus itself is a product of mass production, a user recognizes the indoor positioning apparatus as a personalized apparatus, thereby making it possible to obtain an effect of a user customized product.

The effects of the present disclosure are not limited to those mentioned above, and other effects not mentioned can be clearly understood by those skilled in the art from the following description.

BRIEF DESCRIPTION OF THE DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

DETAILED DESCRIPTION

Figure 1:
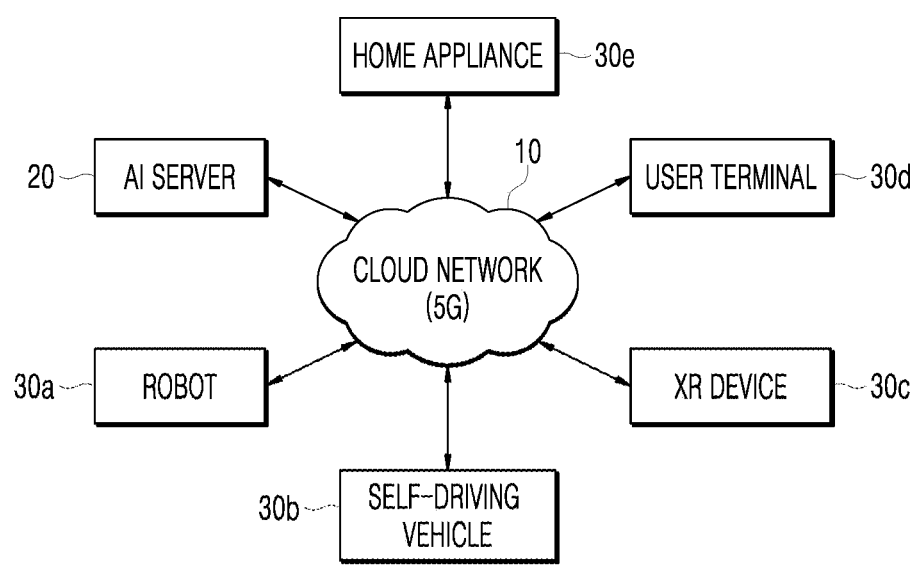
FIG. 1 illustrates an example of an AI system-based indoor positioning system environment including an AI server, a self-driving vehicle, a robot, an XR device, a user terminal or a home appliance, and a cloud network that connects one or more of these components.

The advantages and features of the present disclosure and methods to achieve them will be apparent from the embodiments described below in detail in conjunction with the accompanying drawings. However, the description of particular exemplary embodiments is not intended to limit the present disclosure to the particular exemplary embodiments disclosed herein, but on the contrary, it should be understood that the present disclosure is to cover all modifications, equivalents and alternatives falling within the spirit and scope of the present disclosure. The exemplary embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification if it is determined that such details are not necessary to obtain a complete understanding of the present disclosure.

The terminology used herein is used for the purpose of describing particular exemplary embodiments only and is not intended to be limiting. As used herein, the articles "a," "an," and "the," include plural referents unless the context clearly dictates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. Furthermore, these terms such as "first," "second," and other numerical terms, are used only to distinguish one element from another element. These terms are only used to distinguish one element from another.

A vehicle described herein may be a concept including an automobile and a motorcycle. In the following, the vehicle will be described mainly as an automobile.

Vehicles described in this specification may include all vehicles such as a motor vehicle having an engine as a power source, a hybrid vehicle having an engine and an electric motor as power sources, and an electric vehicle having an electric motor as a power source.

The vehicle mentioned in this disclosure may be a self-driving vehicle, and may also be a specially manufactured vehicle for map creation. However, the vehicle in this disclosure is not limited thereto.

Hereinafter, embodiments of the present disclosure will be described in detail with reference to the accompanying drawings. Like reference numerals designate like elements throughout the specification, and overlapping descriptions of the elements will not be provided.

FIG. 1 illustrates an example of an AI system-based indoor positioning system environment including an AI server, a self-driving vehicle, a robot, an XR device, a user terminal or a home appliance, and a cloud network that connects one or more of these components according to an embodiment of the present disclosure.

Referring to FIG. 1, the AI system-based indoor positioning system environment may include an AI server 20, a robot 30a, a self-driving vehicle 30b, an XR device 30c, a user terminal 30d or a home appliance 30e, and a cloud network 10. At this time, in the AI system-based indoor positioning system environment, at least one of the AI server 20, the robot 30a, the self-driving vehicle 30b, the XR device 30c, and the user terminal 30d or the home appliance 30e can be connected to the cloud network 10. Here, examples such as the robot 30a, the self-driving vehicle 30b, the XR device 30c, the user terminal 30d or the home appliance 30e to which the AI technology is applied may be referred to as "AI devices 30a to 30e."

The robot 30a may refer to a machine which automatically handles a given task by its own ability, or which operates autonomously. In particular, a robot having a function of recognizing an environment and performing an operation according to its own determination may be referred to as an intelligent robot. Robots 30a may be classified into industrial, medical, household, and military robots, according to the purpose or field of use.

The self-driving vehicle 30b refers to a vehicle which travels without the user's manipulation or with minimal manipulation of the user, and may also be referred to as an autonomous-driving vehicle. For example, autonomous driving may include all of a technology for keeping a driving lane, a technology for automatically controlling a speed such the an adaptive cruise control, a technology for automatically driving a vehicle along a determined path, and a technology for, if a destination is set, automatically setting a path and driving a vehicle along the path. In this case, an autonomous vehicle may be considered as a robot with an autonomous driving function.

The XR device 30c refers to a device using extended reality (XR), which collectively refers to virtual reality (VR), augmented reality (AR), and mixed reality (MR). VR technology provides objects or backgrounds of the real world only in the form of CG images, AR technology provides virtual CG images overlaid on the physical object images, and MR technology employs computer graphics technology to mix and merge virtual objects with the real world. XR technology may be applied to, for example, a head-mounted display (HMD), a head-up display (HUD), a mobile phone, a tablet PC, a laptop computer, a desktop computer, a TV, and a digital signage. A device employing XR technology may be referred to as an XR device.

The user terminal 30d, after accessing an indoor positioning system operation application or an indoor positioning system operation site, can be provided with a service for operating or controlling the indoor positioning system through an authentication process. In the present embodiment, the user terminal 30d that has passed the authentication process can operate the indoor positioning system 1 and control the operation of the indoor positioning apparatus 100. In the present embodiment, the user terminal 30d may be a desktop computer, a smartphone, a notebook, a tablet PC, a smart TV, a cell phone, a personal digital assistant (PDA), a laptop, a media player, a micro server, a global positioning system (GPS) device, an electronic book terminal, a digital broadcast terminal, a navigation device, a kiosk, an MP3 player, a digital camera, a home appliance, and other mobile or immobile computing devices operated by the user, but is not limited thereto. In addition, the user terminal 30d may be a wearable terminal having a communication function and a data processing function, such as a watch, glasses, a hair band, and a ring. The user terminal 30d is not limited thereto. Any terminal that is capable of performing web browsing may be used without limitation.

The home appliance 30e may include any one of all electronic devices provided in a home. In particular, the home appliance 30e may include a terminal capable of implementing, for example, voice recognition and artificial intelligence, and a terminal for outputting at least one of an audio signal and a video signal. In addition, the home appliance 30e may include various home appliances (for example, a washing machine, a drying machine, a clothes processing apparatus, an air conditioner, or a kimchi refrigerator) without being limited to specific electronic devices.

The cloud network 10 may include part of the cloud computing infrastructure or refer to a network existing in the cloud computing infrastructure. Here, the cloud network 10 may be constructed by using the 3G network, 4G or long term evolution (LTE) network, or a 5G network. In other words, each individual device 30a to 30e and 20 constituting the AI system-based sound control system environment can be connected to each other through the cloud network 10. In particular, each individual device (30a to 30e, 20) may communicate with each other through the base station but may communicate directly to each other without relying on the base station.

The cloud network 10 may include, for example, wired networks such as local area networks (LANs), wide area networks (WANs), metropolitan area networks (MANs), and integrated service digital networks (ISDNs), or wireless networks such as wireless LANs, CDMA, Bluetooth, and satellite communication, but the scope of the present disclosure is not limited thereto. Furthermore, the cloud network 10 may transmit and receive information using short-range communications or long-distance communications. The short-range communication may include Bluetooth®, radio frequency identification (RFID), infrared data association (IrDA), ultra-wideband (UWB), ZigBee, and wireless-fidelity (Wi-Fi) technologies, and the long-range communication may include code division multiple access (CDMA), frequency division multiple access (FDMA), time division multiple access (TDMA), orthogonal frequency division multiple access (OFDMA), and single carrier frequency division multiple access (SC-FDMA).

The cloud network 10 may include connection of network elements such as hubs, bridges, routers, switches, and gateways. The cloud network 10 may include one or more connected networks, including a public network such as the Internet and a private network such as a secure corporate private network. For example, the network may include a multi-network environment. The access to the cloud network 10 can be provided via one or more wired or wireless access networks. Furthermore, the cloud network 10 may support 5G communication and/or an Internet of Things (IoT) network for exchanging and processing information between distributed components such as objects.

The AI server 20 may include a server performing AI processing and a server performing computations on big data. Further, the AI server 20 may be a database server that provides big data required for application of various AI algorithms and data for operating the indoor positioning system 1. In addition, the AI server 20 may include a web server or an application server for remote control of the operation of the indoor positioning apparatus 100 using an indoor positioning system operation application or an indoor positioning system operation web browser installed at the user terminal 30d.

Further, the AI server 20 is connected to at least one of the AI devices constituting the AI system-based indoor positioning system environment, such as the robot 30a, the self-driving vehicle 30b, the XR device 30c, and the user terminal 30d or the home appliance 30e, through the cloud network 10, and can assist at least a part of the AI processing of the AI devices 30a to 30e connected thereto. At this time, the AI server 20 may train the AI network according to the machine learning algorithm instead of the AI devices 30a to 30e, and may directly store the learning model or transmit the learning model to the AI devices 30a to 30e. At this time, the AI server 20 may receive input data from the AI device 30a to 30e, infer a result value from the received input data by using the learning model, generate a response or control command based on the inferred result value, and transmit the generated response or control command to the AI device 30a to 30e. Similarly, the AI device 30a to 30e may infer a result value from the input data by employing the learning model directly and generate a response or control command based on the inferred result value.

Artificial intelligence (AI) is an area of computer engineering science and information technology that studies methods to make computers mimic intelligent human behaviors such as reasoning, learning, and self-improving.

In addition, artificial intelligence (AI) does not exist on its own, but is rather directly or indirectly related to a number of other fields in computer science. In recent years, there have been numerous attempts to introduce an element of AI into various fields of information technology to solve issues in the respective fields.

Machine learning is an area of artificial intelligence that includes the field of study that gives computers the capability to learn without being explicitly programmed. Specifically, machine learning can be a technology for researching and constructing a system for learning, predicting, and improving its own performance based on empirical data and an algorithm for the same. Machine learning algorithms, rather than only executing rigidly set static program commands, may take an approach that builds models for deriving predictions and decisions from inputted data.

The present embodiment particularly relates to the self-driving vehicle 30b. Thus, among the above-mentioned AI devices to which the technology is applied, the self-driving vehicle 30b will be described in the embodiments below. However, in the present embodiment, the vehicle (200 of FIG. 2) is not limited to the self-driving vehicle 30b, and may refer to any vehicles, including the self-driving vehicle 30b and general vehicles. In the present embodiment, a vehicle having the indoor positioning system 1 is illustrated as an example.

Figure 2:
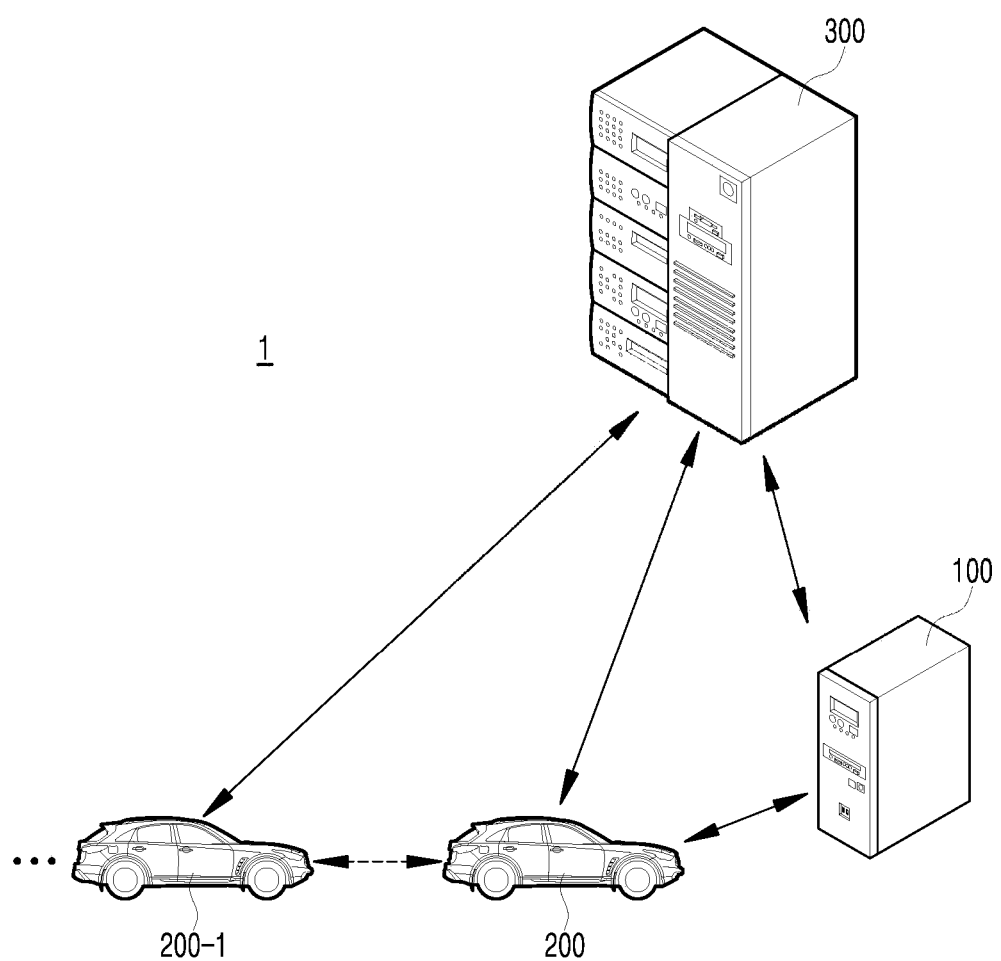
FIG. 2 schematically explains a communication environment of an indoor positioning system.

FIG. 2 schematically explains the communication environment of the indoor positioning system according to an embodiment of the present disclosure. Description overlapping with that of FIG. 1 will be omitted.

Referring to FIG. 2, the indoor positioning system 1 includes an indoor positioning apparatus 100, a first vehicle 200, a second vehicle 200-1, and a server 300, and may further include devices such as a user terminal, a network, and an n-th vehicle 200-n. At this time, the indoor positioning apparatus 100 may be, but not necessarily, provided in each of examples such as the first vehicle 200 and the second vehicle 200-1. In the present embodiment, the first vehicle 200 indicates a vehicle that enters a certain indoor space and captures images of the certain indoor space, and the second vehicle 200-1 may indicate a vehicle that has originally created an indoor map of the certain indoor space that the first vehicle 200 enters.

In other words, in the present embodiment for indoor positioning, an indoor positioning may be performed in a certain space using a simultaneous localization and mapping (SLAM) map created by image-based SLAM technology. Although the present embodiment is illustrated, as an example, using indoor positioning, the present disclosure is not limited thereto and outdoor positioning can be performed.

Here, SLAM is a technology that acquires information on a surface and an indoor environment where a mobile robot such as a vehicle works, utilizing a sensor attached to the mobile robot (sensing), expresses and stores the information in various maps (mapping), and estimates a current position of the mobile robot based on the stored map (position recognition). In other words, the SLAM, which is a basic and an essential technology for self-driving of the mobile robot, can calculate the position of the robot and acquire the map utilizing an optimal algorithm obtained by combining information from a sensor system of the mobile robot. A generally used sensor may be, for example, an RGB-D camera (or stereo camera), a laser distance sensor (LiDAR), a gyro sensor, or an encoder. The RGB-D camera and the LiDAR provide precise geographic information on a space, and thus are widely used for geometric modeling of the environment. The SLAM can be used in various fields such as factory and distribution center environments, indoor commercial spaces, home spaces, and last mile delivery using pedestrian roads. Therefore, a deep learning-based vision technology is actively developing for more accurate SLAM. The development of the deep learning-based vision technology enables semantic information to be extracted from image information, and semantic-based self-driving using semantic information is developing. Accordingly, the map for self-driving of the mobile robot is expressed as an abstract semantic map, which makes possible driving to a destination where a map for the robot is not available.

The SLAM can be implemented in various manners. For example, a local descriptor-based topology SLAM can utilize various image features by extracting main features such as points, lines, and image patches from a texture constituting an image and distinguishing images by matching the main features with features extracted from images of a database (for example, Harris, ORB, FAST, BRICKS, SIFT, SURF, KAZE, and AKAZE). These features have a descriptor that can be distinguished based on a texture and can be used as a landmark for distinguishing images. In the case of performing self-driving based on a pre-created map, there may be changes in the driving environment due to a difference between a time when the map was created and a current time. In this case, the SLAM technology is required to accurately recognize a position based on the pre-created inaccurate map and, also, to update the map to the latest version.

In other words, in the present embodiment, a SLAM map of the certain indoor space was originally created by the second vehicle 200-1, and the SLAM map can be updated to the latest version by allowing the first vehicle 200 to enter a certain indoor space and perform the indoor positioning based on the SLAM map created by the second vehicle 200-1.

In the present embodiment, the server 300 may include examples such as the AI server 20 shown in FIG. 1, a mobile edge computing (MEC) server, and a server for processing of the indoor positioning apparatus 100, and all the servers may be collectively referred to as the server 300. When the server 300 is another server that is not mentioned in the present embodiment, the connection illustrated in FIG. 2, for example, may be changed.

The AI server can receive data for indoor positioning within a certain indoor space from the first vehicle 200, analyze images of the indoor space captured in the first vehicle 200, and perform learning for image matching with the camera information of the pre-created indoor map of the certain indoor space or the reference image information based on the analyzed image. Further, the AI server can perform learning for indoor positioning of the certain indoor space based on the image matching result. Moreover, the AI server can transmit the learning result for the image matching and the learning result for the indoor positioning to the indoor positioning apparatus 100 so that the indoor positioning apparatus 100 can perform an operation for indoor positioning, in other words, creation and updating of the SLAM map, for example.

The MEC server can serve as a general server, and can also provide flexible vehicle-related services while being connected to a base station (B S) next to a road within a radio access network (RAN) and allow effective utilization of the network. In particular, network-slicing and traffic scheduling policies supported by the MEC server can assist the optimization of the network. The MEC server is integrated inside the RAN, and may be located in an S1-user plane interface (for example, between the core network and the base station) in the 3 GPP system. The MEC server may be regarded as an independent network element, and does not affect the connection of the existing wireless networks. The independent MEC servers may be connected to the base station via the dedicated communication network and may provide specific services to various end-users located in the cell. These MEC servers and the cloud servers may be connected to each other through an Internet-backbone, and share information with each other. Further, the MEC server can operate independently and control a plurality of base stations. Services for self-driving vehicles, application operations such as virtual machines (VMs), and operations at the edge side of mobile networks based on a virtualization platform may be performed. The base station (BS) may be connected to both the MEC servers and the core network to enable flexible user traffic scheduling required for performing the provided services. When a large amount of user traffic occurs in a specific cell, the MEC server may perform task offloading and collaborative processing based on the interface between neighboring base stations. That is, since the MEC server has an open operating environment based on software, new services of an application provider may be easily provided. Since the MEC server performs the service at a location near the end-user, the data round-trip time is shortened and the service providing speed is high, thereby reducing the service waiting time. MEC applications and virtual network functions (VNFs) may provide flexibility and geographic distribution in service environments. When using this virtualization technology, various applications and network functions can be programmed, and only specific user groups may be selected or compiled for them. Therefore, the provided services may be applied more closely to user requirements. In addition to centralized control ability, the MEC server may minimize interaction between base stations. This may simplify the process for performing basic functions of the network, such as handover between cells. This function may be particularly useful in autonomous driving systems used by a large number of users. In the autonomous driving system, the terminals of the road may periodically generate a large amount of small packets. In the RAN, the MEC server may reduce the amount of traffic that must be delivered to the core network by performing certain services. This may reduce the processing burden of the cloud in a centralized cloud system, may minimize network congestion. The MEC server may integrate network control functions and individual services, which can increase the profitability of mobile network operators (MNOs). Installation density adjustment enables fast and efficient maintenance and upgrades.

In the present embodiment, the first vehicle 200 may include examples such as a vehicle communication module, a vehicle control module, a vehicle user interface module, a driving manipulation module, a vehicle driving module, an operation module, a navigation module, or a sensing module. Depending on the embodiment, the first vehicle 200 may further include other components in addition to the above-described components or may not include a part of the components to be described below. Although the first vehicle 200 is mainly described in the present embodiment, the second vehicle 200-1 may include the same components as those of the first vehicle 200. In other words, the first vehicle 200 and the second vehicle 200-1 may indicate the same type of vehicle.

Here, the first vehicle 200 may be a self-driving vehicle, and can be switched from a self-driving mode to a manual mode or from the manual mode to the self-driving mode by a user input received through the vehicle user interface module. Further, the first vehicle 200 can be switched from the self-driving mode to the manual mode or from the manual mode to the self-driving mode depending on a driving status. Here, the driving status can be determined by at least one of information received by the vehicle communication module, external object information detected by the sensing module, and navigation information obtained by the navigation module.

In the present embodiment, the first vehicle 200 can receive, from a user, a service request (user input) for control. The first vehicle 200 receives the service request from the user when, for example, a touch (or button input) signal for the vehicle user interface module is received from the user or when a spoken utterance corresponding to the service request is received from the user. At this time, the touch signal or the spoken utterance from the user can be received using the user terminal (30*d* in FIG. 1). In order to receive the spoken utterance, a separate microphone is provided to execute a voice recognition function.

When the first vehicle 200 operates in the self-driving mode, the first vehicle 200 can operate under the control of the operation module for controlling driving, starting, and parking operations. When the first vehicle 200 operates in the manual mode, the first vehicle 200 can operate by a driver's input through the driving manipulation module. The first vehicle 200 is connected to an external server through a communication network and can move along a preset path using an autonomous driving technology without driver involvement.

The vehicle user interface module for communication between the first vehicle 200 and a vehicle user, can receive a user's input signal, transmit the received input signal to the vehicle control module, and provide information of the first vehicle 200 to the user under the control of the vehicle control module. The vehicle user interface module 1300 may include, but is not limited to, an input module, an internal camera, a bio-sensing module, and an output module.

The input module allows a user to input information. The data collected by the input module can be analyzed by the vehicle control module and processed as a user's control command. Further, the input module can allow the user to input a destination of the first vehicle 200, and provide the inputted destination to the vehicle control module. Moreover, the input module can, according to the user input, input to the vehicle control module a signal for specifying and deactivating at least one sensor module among a plurality of sensor modules of the sensing module. The input module may be disposed inside the vehicle. For example, the input module may be disposed on one area of a steering wheel, one area of an instrument panel, one area of a seat, one area of each pillar, one area of a door, one area of a center console, one area of a head lining, one area of a sun visor, one area of a windshield, or one area of a window.

The output module for outputting, for example, a visual output, an auditory output, or a haptic output can output a sound or an image. Furthermore, the output module may include at least one of a display module, a sound output module, and a haptic output module.

The display module may display graphic objects corresponding to various information. The display module may including at least one of a liquid crystal display (LCD), a thin film transistor liquid crystal display (TFT LCD), an organic light emitting diode (OLED), a flexible display, a 3D display, or an e-ink display. The display module may have a mutual layer structure with a touch input module, or may be integrally formed to implement a touch screen. The display module may be implemented as a head up display (HUD). When the display module is implemented as an HUD, the display module may include a projection module to output information through an image projected onto a windshield or a window. The vehicle user interface module may include a plurality of display modules. The display module may be disposed in one area of the steering wheel, one area of the instrument panel, one area of the seat, one area of each pillar, one area of the door, one area of the center console, one area of the head lining, or one area of the sun visor, or may be implemented on one area of the windshield or one area of the window.

The sound output module can convert an electric signal provided from the vehicle control module to an audio signal and output the audio signal. To this end, the sound output module may include one or more speakers. The haptic output module may generate a tactile output. For example, the haptic output module may operate to allow the user to perceive the output by vibrating a steering wheel, a seat belt, and a seat.

The operation manipulation module can receive a user input for driving. In the case of the manual mode, the first vehicle 200 can operate based on a signal provided by the driving manipulation module. In other words, the driving manipulation module receives the input for the driving of the first vehicle 200 in the manual mode, and may include, but is not limited to, a steering input module, an acceleration input module, and a break input module.

The vehicle driver 1500 may electrically control the driving of various devices in the vehicle 200, and may include a powertrain driving module, a chassis driving module, a door/window driving module, a safety device driving module, a lamp driving module, and an air conditioning driving module, but the present disclosure is not limited thereto.

The operation module can control various operations of the first vehicle 200 particularly in the self-driving mode. The operation module may include, but is not limited to, a driving module, a starting module, and a parking module. Further, the operation module may include a processor controlled by the vehicle control module. Each module of the operation module may include a processor individually. Depending on the embodiment, when the operation module is implemented as software, the operation module may be a sub-concept of the vehicle control module.

At this time, the driving module, the starting module, and the parking module can perform driving, starting, and parking of the first vehicle 200, respectively. Further, the driving module, the starting module, and the parking module can receive the object information from the sensing module and provide control signals to the vehicle driving module to perform driving, starting, and parking of the first vehicle 200, respectively. Further, the driving module, the starting module, and the parking module can receive signals from external devices through the vehicle communication module and provide the control signals to the vehicle driving module to perform driving, starting, and parking of the first vehicle 200, respectively. Furthermore, the driving module, the starting module, and the parking module can receive the navigation information from the navigation module and provide the control signals to the vehicle driving module to perform driving, starting, and parking of the first vehicle 200, respectively. The navigation module can provide the navigation information to the vehicle control module. The navigation information may include at least one of map information, set destination information, route information according to destination setting, information about various objects on the route, lane information, or current location information of the vehicle.

Particularly in the present embodiment, the navigation module can provide the vehicle control module with map data and map information data of a certain indoor space that the first vehicle 200 enters. In other words, in the present embodiment, when the first vehicle 200 enters a certain indoor space, the vehicle control module receives a pre-created indoor map (for example, a SLAM map) of the certain indoor space from the navigation module and projects a calculated moving path and fixed identification information on the SLAM map to generate the map data.

The navigation module may include a memory. The memory may store navigation information. The navigation information can be updated by information received from the vehicle communication module. The navigation module can, but not necessarily, be controlled by a built-in processor or can operate by an external signal, for example, the control signal from the vehicle control module.

The sensing module can sense a state of the first vehicle 200 using sensors attached to the first vehicle 200. In other words, the sensing module can detect a signal related to the state of the first vehicle 200. Then, the sensing module can obtain moving path information of the first vehicle 200 based on the detected signal. The sensing module can provide the obtained moving path information to the vehicle control module. Moreover, the sensing module can sense an object, for example, near the first vehicle 200 using the sensors attached to the first vehicle 200.

Further, the sensing module for detecting an object outside the first vehicle 200 can generate object information based on the sensing data and transmit the generated object information to the vehicle control module. At this time, the object may include various objects related to the operation of the first vehicle 200, such as lanes, other vehicles, pedestrians, two-wheeled vehicles, traffic signals, lights, roads, structures, speed bumps, landmarks, and animals. The sensor 1700 may be a plurality of sensor modules, and may include a camera module, a lidar (light imaging detection and ranging), an ultrasonic sensor, a radar (radio detection and ranging), and an infrared sensor as a plurality of image capturers. The sensing module can sense information on a neighboring environment of the first vehicle 200 using a plurality of sensor modules. Depending on the embodiment, the sensing module may further include other components in addition to the above-described components, or may not include a part of the above-described components.

The image capturer may be disposed at a suitable position outside the first vehicle 200, for example, at a front side, a rear side, a right side mirror, or a left side mirror of the first vehicle 200, to capture images outside the first vehicle 200. The image capturer may be a mono camera, but is not limited thereto. The image capturer may be a stereo camera, an around view monitoring (AVM) camera, or a 360-degree camera. The image capturer may be disposed near a front windshield inside the vehicle 200 to capture images at the front side of the first vehicle 200. The image capturer may be disposed around the front bumper or the radiator grill. The image capturer may be disposed close to the rear glass in the interior of the vehicle in order to acquire an image of the back of the vehicle 200. The image capturer may be disposed around the rear bumper, the trunk, or the tail gate. The image capturer may be disposed near at least one of the side windows inside the vehicle 200 to capture images at the side of the vehicle 200. In addition, the image capturer may be disposed around the fender or the door.

The vehicle control module can control an overall operation of the respective modules of the sensing module. The vehicle control module can detect or distinguish objects by comparing the data sensed by a radar, a lidar, an ultrasonic sensor, and an infrared sensor with pre-stored data. The vehicle control module can detect and track the objects based on the acquired images. The vehicle control module can calculate, for example, a distance to the object or a relative speed to the object using an image processing algorithm. For example, the vehicle control module can acquire information on the distance and the relative speed to the object from the acquired image based on temporal changes in the object size. For example, the vehicle control module can acquire the information on the distance and the relative speed to the object using, for example, a pin hole model or road surface profiling.

The vehicle control module can detect and track the object based on reflected waves (or reflected light) of one of electromagnetic waves, laser, ultrasonic waves, and infrared waves transmitted and reflected by the object. At this time, the vehicle control module can calculate, for example, the distance to the object and the relative speed to the object based on the reflected waves (or reflected light). Depending on the embodiment, the sensing module may include therein an individual processor from the vehicle control module. Further, the radar, the lidar, the ultrasonic sensor, and the infrared sensor may include individual processors. When the sensing module includes a processor, the sensing module can operate under the control of the processor controlled by the vehicle control module.

The sensor 1700 may include an orientation sensor (for example, a yaw sensor, a roll sensor, and a pitch sensor), a collision sensor, a wheel sensor, a speed sensor, a tilt sensor, a weight sensor, a heading sensor, a gyro sensor, a position module, a vehicle forward/reverse movement sensor, a battery sensor, a fuel sensor, a tire sensor, a steering sensor by rotation of a steering wheel, a vehicle interior temperature sensor, a vehicle interior humidity sensor, an ultrasonic sensor, an illuminance sensor, an accelerator pedal position sensor, and a brake pedal position sensor. The sensor 1700 may further include an acceleration pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS). The sensing module can generate vehicle state information based on the sensing data. The vehicle state information may be information generated based on data sensed by various sensors included in the inside of the vehicle. Vehicle state information may include, for example, attitude information of the vehicle, speed information of the vehicle, tilt information of the vehicle, weight information of the vehicle, direction information of the vehicle, battery information of the vehicle, fuel information of the vehicle, tire air pressure information of the vehicle, steering information of the vehicle, interior temperature information of the vehicle, interior humidity information of the vehicle, pedal position information, or vehicle engine temperature information.

Figure 3:
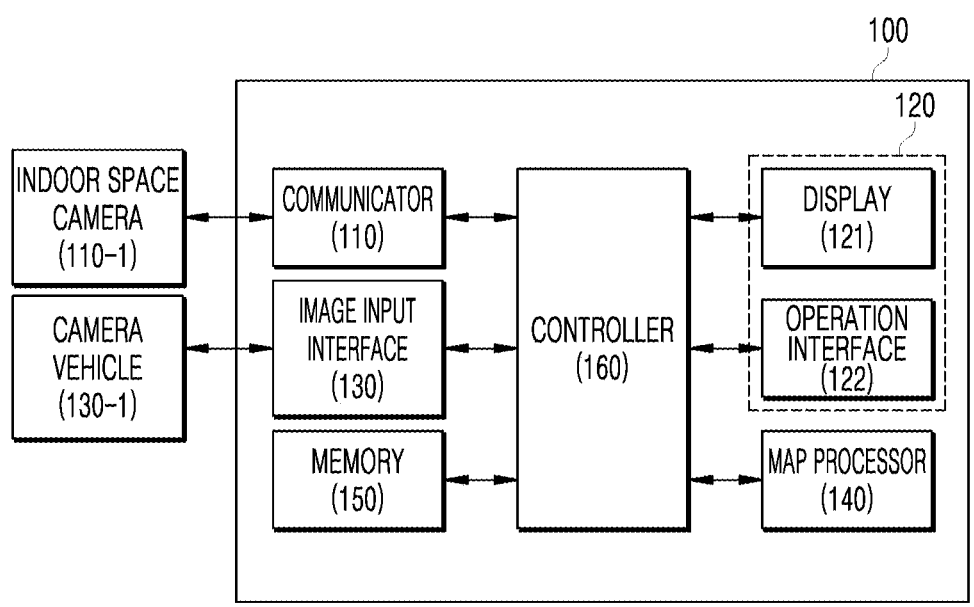
FIG. 3 is a schematic block diagram of the indoor positioning system.

FIG. 3 is a schematic block diagram of the indoor positioning system according to an embodiment of the present disclosure. Hereinbelow, description overlapping with that of FIGS. 1 and 2 will be omitted.

Referring to FIG. 3, the indoor positioning system 1 may include the indoor positioning apparatus 100, an indoor space camera 110-1 disposed in a certain indoor space, and a vehicle camera 130-1 disposed in the first vehicle 200. In the present embodiment, the first vehicle 200 can enter a certain indoor space and capture images of the certain indoor space using the vehicle camera 130-1 to perform the indoor positioning. Further, the accurate indoor positioning can be performed by matching information on a camera for a pre-created indoor map of the certain indoor space that the first vehicle 200 enters with information on the vehicle camera 130-1 of the first vehicle 200. Further, in the present embodiment, a reference image for a vehicle when the vehicle enters a certain indoor space is captured by the indoor space camera 110-1 disposed in the certain indoor space and matched with an image of the first vehicle 200 when it enters the certain indoor space, thereby performing more accurate indoor positioning. At this time, the indoor space camera 110-1 and the vehicle camera 130-1 may include image sensors, and may be implemented in different manners. Further, there may be a plurality of indoor space cameras 110-1 and a plurality of vehicle cameras 130-1, and the positions thereof are not limited. In the present embodiment, the indoor space camera 110-1 may be installed at an entrance of the certain indoor space, and the vehicle camera 130-1 may be installed at a front side of the vehicle.

More specifically, the indoor positioning apparatus 100 may include a communicator 110, a user interface 120, an image input interface 130, a map processor 140, a memory 150, and a controller 160.

The communicator 110 may be a vehicle communication module for communication between the first vehicle 200 and an external device. The communicator 110 can support communication in a plurality of communication modes, receive a server signal from a server, and transmit a signal to the server. In addition, the communicator 110 may receive a signal from another vehicle, transmit a signal to another vehicle, receive a signal from the user terminal, and transmit a signal to the user terminal. That is, the external device may include another vehicle, a user terminal, and a server system. Further, the communicator 110 may include communication modules for communication inside the vehicle. Here, the communication modes may include, for example, an inter-vehicle communication mode for communication with another vehicle, a server communication mode for communication with an external server, a short-distance communication mode for communication with a user terminal such as a user terminal inside the vehicle, and an intra-vehicle communication mode for communication with units inside the vehicle. In other words, the communicator 110 may include, for example, a wireless communication module, a V2X communication module, or a short-distance communication module.

The wireless communication module can transmit and receive signals to and from the user terminal or the server through a mobile communication network. Here, the mobile communication network is a multiple access system capable of supporting communication with multiple users by sharing used system resources (for example, bandwidth or transmission power). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

The V2X communication module can transmit and receive signals to and from an RSU using a V2I communication protocol in a wireless manner, transmit and receive signals to and from another vehicle using a V2V communication protocol, and transmit and receive signals to and from a user terminal, in other words, a pedestrian or a user, using a V2P communication protocol. In other words, the V2X communication module may include an RF circuit capable of implementing the V2I communication protocol (communication with infrastructure), the V2V communication protocol (communication between vehicles), and the V2P communication protocol (communication with a user terminal). That is, the vehicle interface 110 may include at least one among a transmit antenna and a receive antenna for performing communication, and a radio frequency (RF) circuit and an RF element capable of implementing various communication protocols.

The short-range transceiver may be connected to the user terminal of the driver through a short-range wireless communication module. In this case, the short-range transceiver may be connected to the user terminal through wired communication as well as wireless communication. For example, if the user terminal of the driver was registered in advance, the short-distance communication module can automatically connect the registered user terminal to the first vehicle 200 when the registered user terminal is recognized within a predetermined distance from the first vehicle 200 (for example, inside the vehicle). That is, the vehicle transceiver 110 may perform short-range communication, GPS signal reception, V2X communication, optical communication, broadcast transmission and reception, and intelligent transport systems (ITS) communication. The transceiver 110 may support short-range communication by using at least one among Bluetooth™, radio frequency identification (RFID), infrared data association (IrDA), ultra-wideband (UWB), ZigBee, near-field communication (NFC), wireless-fidelity (Wi-Fi), Wi-Fi Direct, and wireless universal serial bus (Wireless USB) technologies. The vehicle transceiver 110 may further support other functions than the functions described, or may not support some of the functions described, depending on the embodiment.

Further, depending on the embodiment, the overall operations of the respective modules of the communicator 110 can be controlled by an individual processor provided in the communicator 110. The vehicle transceiver 110 may include a plurality of processors, or may not include a processor. When the communicator 110 does not include a processor, the communicator 110 can operate under the control of a processor of another device in the first vehicle 200 or under the control of the vehicle control module. Further, the communicator 110 can implement a vehicle display together with the vehicle user interface module. In this case, the vehicle display device may be referred to as a telematics device or an audio video navigation (AVN).

In the present embodiment, the communicator 110 can obtain a conversion formula for converting a feature point coordinate system of the reference image of the pre-created indoor map to a feature point coordinate system of the comparative image acquired from the first vehicle 200 using a deep neural model that was pre-trained to match the reference image and the acquired image by extracting image features based on a downlink grant of the 5G network connected to operate the first vehicle 200 having the indoor positioning system 1 in a self-driving mode. At this time, the communicator 110 can receive, from the AI server connected to the 5G network, the reference image information, the image information of the first vehicle 200, and the result of calculating the conversion formula.

Figure 4:
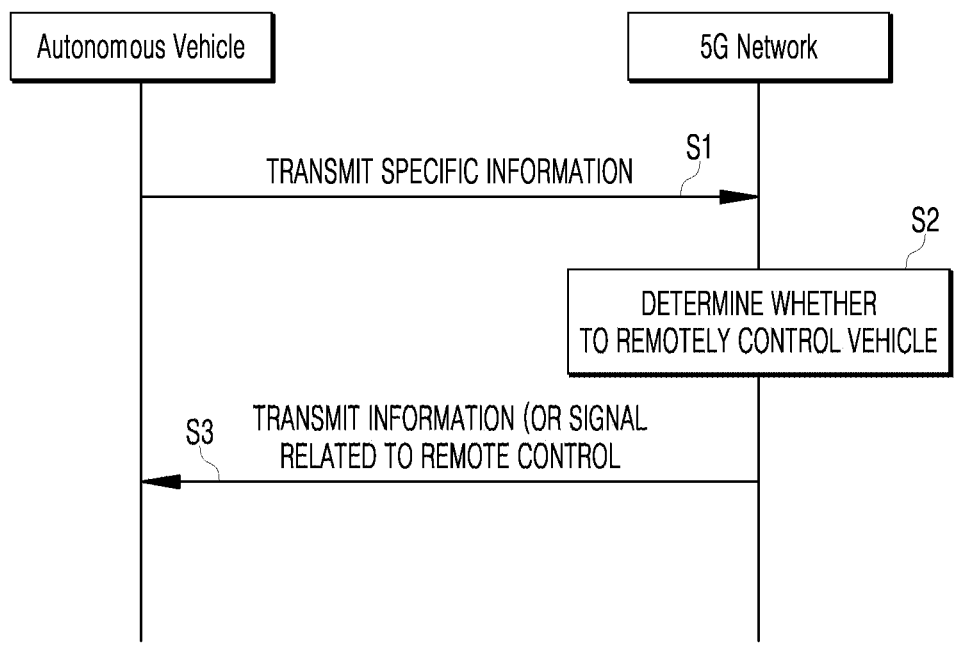
FIG. 4 illustrates an example of basic operations of a self-driving vehicle and a 5G network in a 5G communication system.
Figure 5:
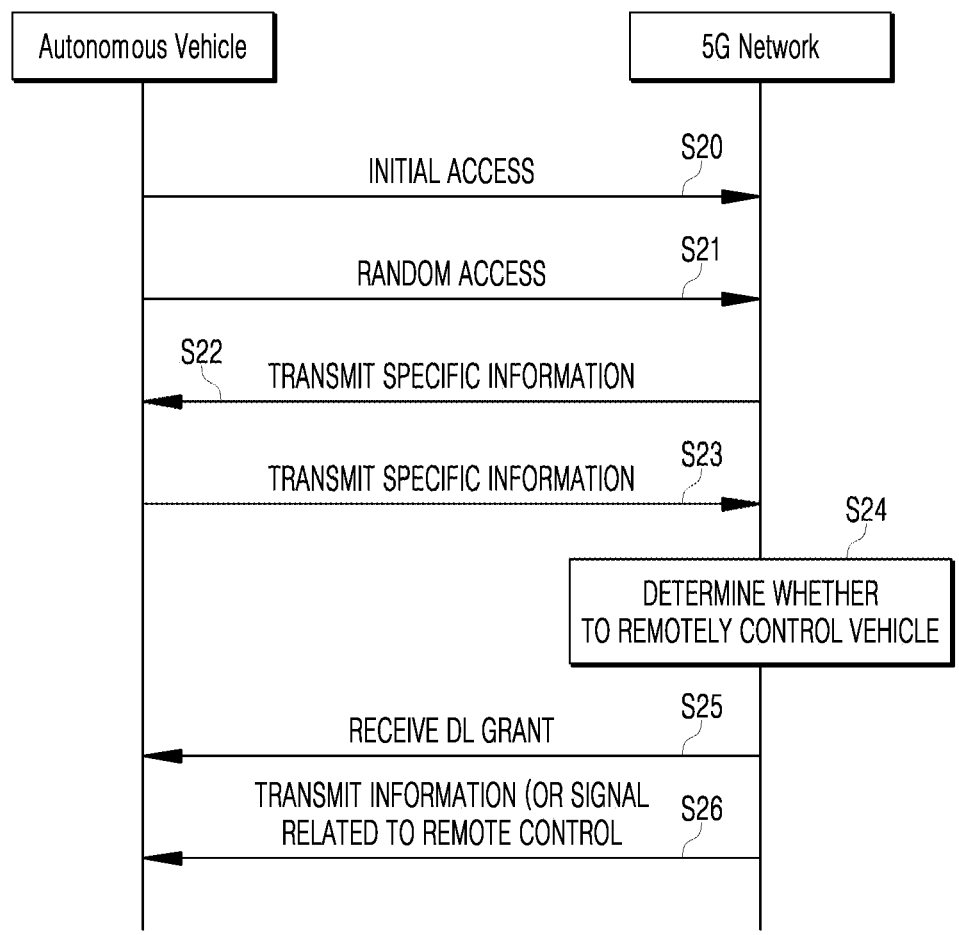
FIG. 5 illustrates an example of application operations of a self-driving vehicle and a 5G network in a 5G communication system.

FIG. 4 is a diagram illustrating an example of the basic operation of an autonomous vehicle and a 5G network in a 5G communication system.

The communicator 110 can transmit specific information to the 5G network when the first vehicle 200 operates in the self-driving mode (S1).

At this time, the specific information may include autonomous driving related information.

The autonomous driving related information may be information directly related to the driving control of the vehicle. For example, the autonomous driving related information may include at least one among object data indicating an object near the vehicle, map data, vehicle status data, vehicle location data, and driving plan data.

The autonomous driving related information may further include service information necessary for autonomous driving. For example, the specific information may include information on a destination inputted through the user interface and information on a safety level of the vehicle.

In addition, the 5G network may determine whether the vehicle is remotely controlled (S2).

The 5G network may include a server or a module for performing remote control related to autonomous driving.

The 5G network may transmit information (or a signal) related to the remote control to an autonomous vehicle (S3).

As described above, information related to the remote control may be a signal directly applied to the autonomous vehicle, and may further include service information necessary for autonomous driving. The autonomous vehicle according to this embodiment may receive service information such as insurance for each interval selected on a driving route and risk interval information, through a server connected to the 5G network to provide services related to the autonomous driving.

An essential process for performing 5G communication between the autonomous vehicle 200 and the 5G network (for example, an initial access process between the vehicle and the 5G network) will be briefly described with reference to FIG. 5 to FIG. 9 below.

First, an example of a modified operation between the first autonomous driving vehicle 200 in a 5G communication system and a 5G network will be described.

The first vehicle 200 may perform an initial access process with the 5G network (initial access step, S20). In this case, the initial access procedure includes a cell search process for acquiring downlink (DL) synchronization and a process for acquiring system information.

The first vehicle 200 may perform a random access procedure with the 5G network (random access step, S21). At this time, the random access procedure includes examples such as a random access response reception process and an uplink (UL) synchronization acquisition process or a preamble transmission process for UL data transmission.

The 5G network transmits an uplink (UL) grant for scheduling of transmission of specific information to the first autonomous driving vehicle 200 (UL grant receiving step, S22).

The procedure by which the first vehicle 200 receives the UL grant includes a scheduling process in which a time/frequency resource is allocated for transmission of UL data to the 5G network.

Further, the first autonomous driving vehicle 200 can transmit specific information to the 5G network based on the UL grant (specific information transmission step, S23).

The 5G network can determine whether or not the first vehicle 200 is remotely controlled based on the specific information transmitted from the first vehicle 200 (vehicle remote control determination step, S24).

The autonomous vehicle 200 may receive the DL grant through a physical DL control channel for receiving a response on pre-transmitted specific information from the 5G network (DL grant receiving step, S25).

The 5G network may transmit information (or a signal) related to the remote control to the autonomous vehicle 200 based on the DL grant (remote control related information transmission step, S26).

A process in which the initial access process and/or the random access process between the 5G network and the autonomous vehicle 200 is combined with the DL grant receiving process has been exemplified. However, the present disclosure is not limited thereto.

For example, an initial access procedure and/or a random access procedure may be performed through an initial access step, an UL grant reception step, a specific information transmission step, a remote control decision step of the vehicle, and an information transmission step associated with remote control. Further, an initial access procedure and/or a random access procedure may be performed through a random access step, an UL grant reception step, a specific information transmission step, a remote control decision step of the vehicle, and an information transmission step associated with remote control. The autonomous vehicle 200 may be controlled by the combination of an AI operation and the DL grant receiving process through the specific information transmission step, the vehicle remote control determination step, the DL grant receiving step, and the remote control related information transmission step.

The above-described operation of the first autonomous driving vehicle 200 is merely an example. Therefore, the present disclosure is not limited thereto.

For example, the operation of the autonomous vehicle 200 may be performed by selectively combining the initial access step, the random access step, the UL grant receiving step, or the DL grant receiving step with the specific information transmission step, or the remote control related information transmission step. The operation of the autonomous vehicle 200 may include the random access step, the UL grant receiving step, the specific information transmission step, and the remote control related information transmission step. The operation of the autonomous vehicle 200 may include the initial access step, the random access step, the specific information transmission step, and the remote control related information transmission step. The operation of the autonomous vehicle 200 may include the UL grant receiving step, the specific information transmission step, the DL grant receiving step, and the remote control related information transmission step.

Figure 6:
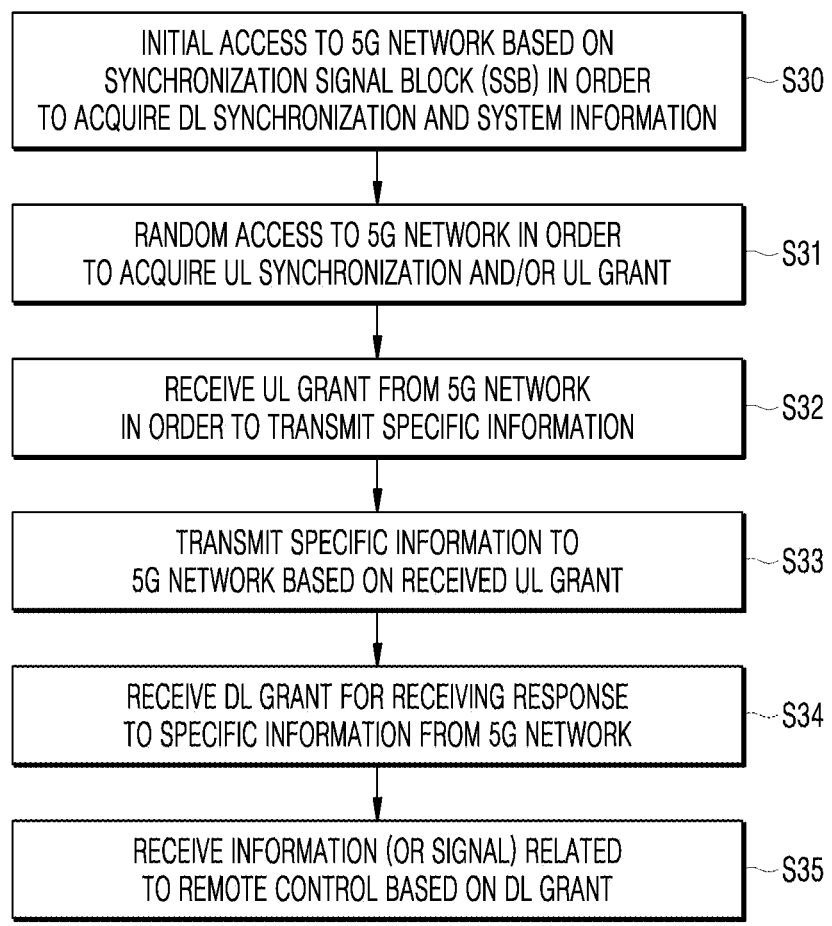
FIGS. 6 to 9 illustrate an example of an operation of a self-driving vehicle using 5G communication.

As illustrated in FIG. 6, the first vehicle 200 including an autonomous driving module may perform an initial access process with the 5G network based on Synchronization Signal Block (SSB) for acquiring DL synchronization and system information (initial access step, S30).

The first autonomous driving vehicle 200 can perform a random access procedure with the 5G network for UL synchronization acquisition and/or UL transmission (random access step, S31).

The first autonomous driving vehicle 200 can receive the UL grant from the 5G network in order to transmit specific information (UL grant receiving step, S32).

Further, the first autonomous driving vehicle 200 transmits the specific information to the 5G network based on the UL grant (specific information transmission step, S33).

Moreover, the first autonomous driving vehicle 200 receives, from the 5G network, a DL grant for receiving a reply on the specific information (DL grant receiving step, S34).

Furthermore, the first autonomous driving vehicle 200 receives the information (or signal) related to the remote control from the 5G network based on the DL grant (remote control related information receiving step, S35).

A beam management (BM) process may be added to the initial access step, and a beam failure recovery process associated with Physical Random Access Channel (PRACH) transmission may be added to the random access step. Quasi co-location (QCL) relation may be added with respect to the beam reception direction of a Physical Downlink Control Channel (PDCCH) including the UL grant in the UL grant receiving step, and QCL relation may be added with respect to the beam transmission direction of the Physical Uplink Control Channel (PUCCH)/Physical Uplink Shared Channel (PUSCH) including specific information in the specific information transmission step. Further, a QCL relationship may be added to the DL grant reception step with respect to the beam receiving direction of the PDCCH including the DL grant.

Figure 7:
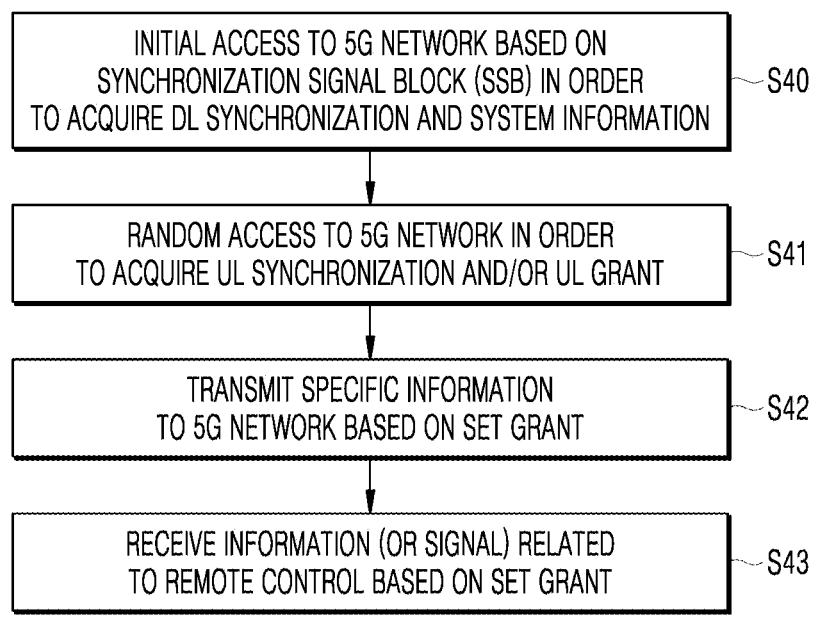

As illustrated in FIG. 7, the first autonomous vehicle 200 may perform an initial access process with the 5G network based on SSB for acquiring DL synchronization and system information (initial access step, S40).

Further, the first autonomous driving vehicle 200 performs a random access procedure with the 5G network, for UL synchronization acquisition and/or UL transmission (random access step, S41).

Moreover, the first autonomous driving vehicle 200 transmits specific information to the 5G network based on the configured grant (UL grant receiving step, S42). In other words, the autonomous vehicle 1000 may receive the configured grant instead of receiving the UL grant from the 5G network.

Furthermore, the first autonomous driving vehicle 200 receives the information (or signal) related to the remote control from the 5G network based on the configured grant (remote control related information receiving step, S43).

Figure 8:
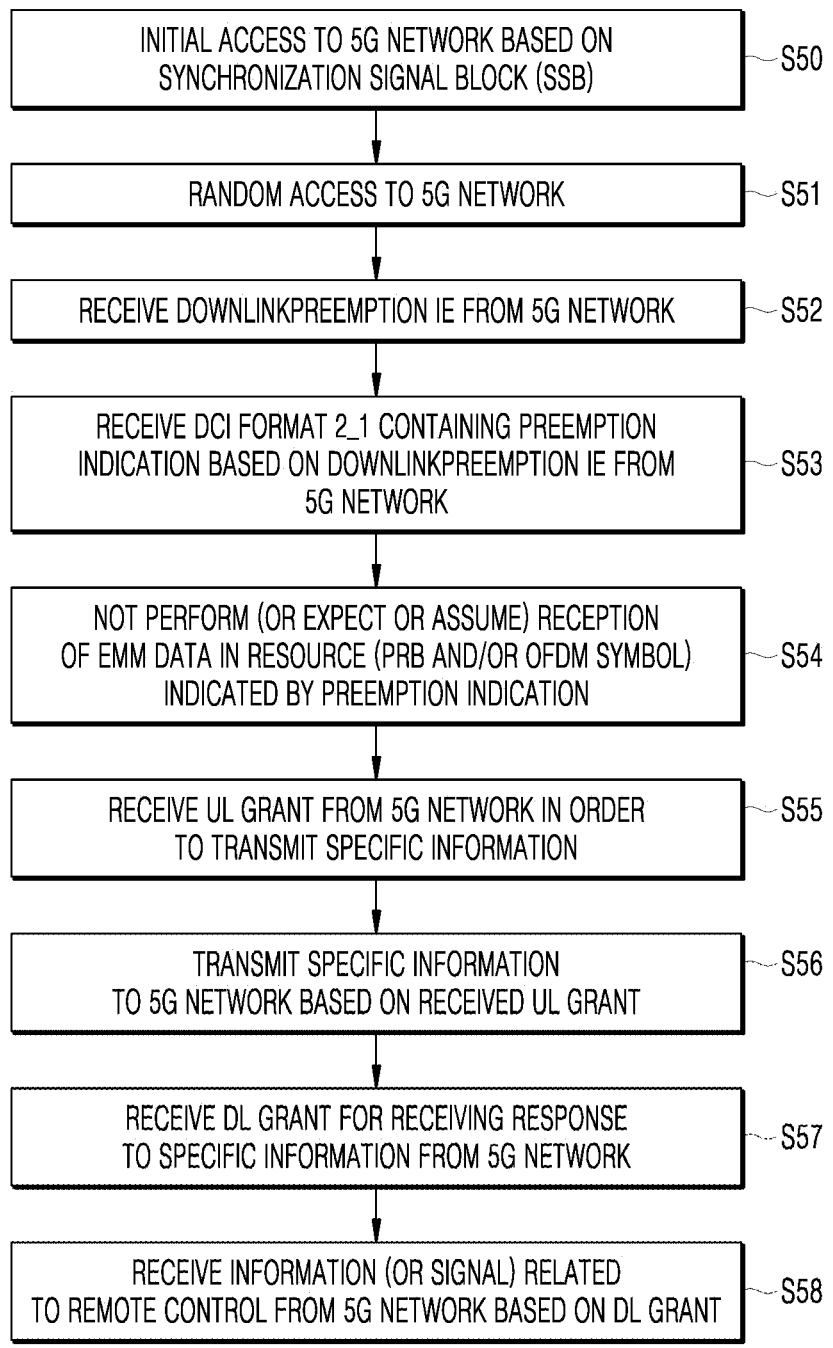

As illustrated in FIG. 8, the first autonomous vehicle 200 may perform an initial access process with the 5G network based on SSB for acquiring DL synchronization and system information (initial access step, S50).

Further, the first autonomous driving vehicle 200 performs a random access procedure with the 5G network for UL synchronization acquisition and/or UL transmission (random access step, S51).

Moreover, the first autonomous driving vehicle 200 receives downlink (DL) preemption information element (IE) from the 5G network (DL preemption IE receiving step, S52).

The first autonomous vehicle 200 may receive downlink control information (DCI) format 2_1 including preemption indication based on the DL preemption IE from the 5G network (DCI format 2_1 receiving step, S53).

The first autonomous vehicle 200 may not perform (or expect or assume) the reception of eMBB data in the resource (PRB and/or OFDM symbol) indicated by the pre-emption indication (step of not receiving eMBB data, S54).

Further, the first autonomous driving vehicle 200 receives the UL grant from the 5G network in order to transmit specific information (UL grant receiving step, S55).

Moreover, the first autonomous driving vehicle 200 transmits the specific information to the 5G network based on the UL grant (specific information transmission step, S56).

Furthermore, the first autonomous driving vehicle 200 receives, from the 5G network, the DL grant for receiving a reply on the specific information (DL grant receiving step, S57).

Further, the first autonomous driving vehicle 200 receives the information (or signal) related to the remote control from the 5G network based on the DL grant (remote control related information receiving step, S58).

Figure 9:
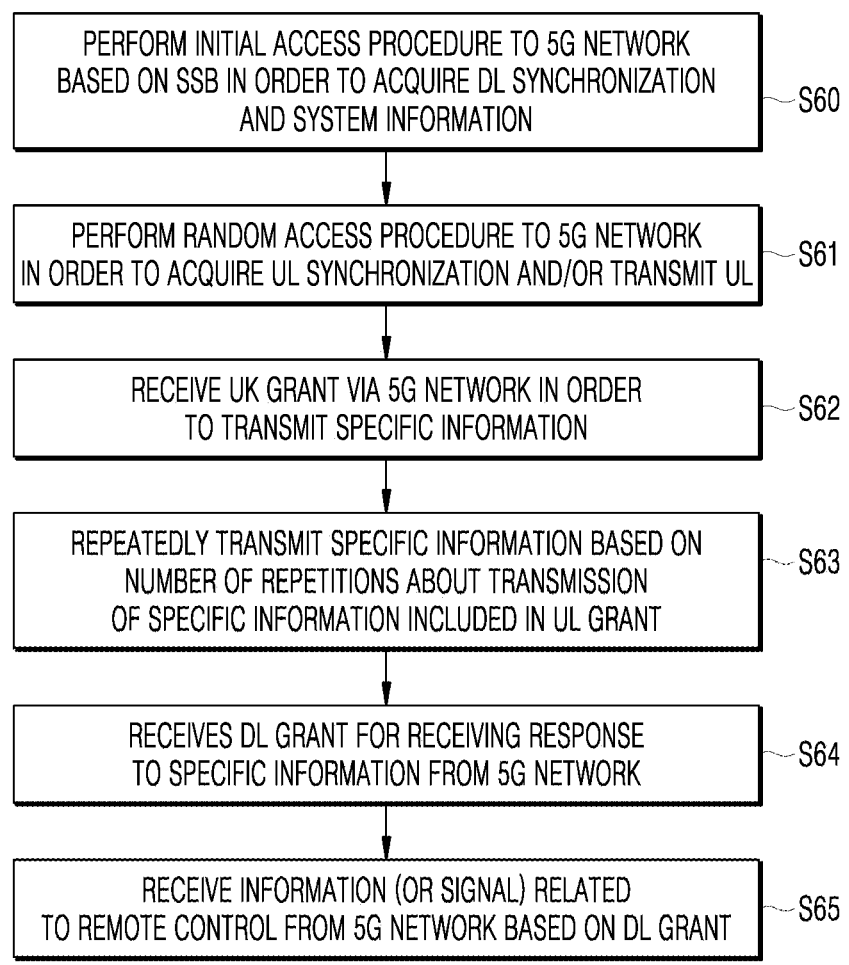

As illustrated in FIG. 9, the first autonomous vehicle 200 may perform an initial access process with the 5G network based on SSB for acquiring DL synchronization and system information (initial access step, S60).

Further, the first autonomous driving vehicle 200 performs a random access procedure with the 5G network for UL synchronization acquisition and/or UL transmission (random access step, S61).

The first autonomous vehicle 200 may receive the UL grant over the 5G network for transmitting specific information (UL grant receiving step, S62).

When specific information is transmitted repeatedly, the UL grant may include information on the number of repetitions, and the specific information may be repeatedly transmitted based on information on the number of repetitions (specific information repetition transmission step, S63).

Moreover, the first autonomous driving vehicle 200 transmits the specific information to the 5G network based on the UL grant.

Also, the repetitive transmission of specific information may be performed through frequency hopping, the first specific information may be transmitted in the first frequency resource, and the second specific information may be transmitted in the second frequency resource.

The specific information may be transmitted through Narrowband of Resource Block (6RB) and Resource Block (1RB).

Furthermore, the first autonomous driving vehicle 200 receives, from the 5G network, the DL grant for receiving the reply on the specific information (DL grant receiving step, S64).

Further, the first autonomous driving vehicle 200 receives the information (or signal) related to the remote control from the 5G network based on the DL grant (remote control related information receiving step, S65).

The above-described 5G communication technique can be applied in combination with the embodiment proposed in this specification, which will be described in FIG. 1 to FIG. 17, or supplemented to specify or clarify the technical feature of the embodiment proposed in this specification.

Among the user interface 120, the display 121 can display an operation state of the indoor positioning system 1 under the control of the controller 160. Depending on the embodiment, the display 121 may form an inter-layer structure with a touch pad so as to be configured as a touch screen. Here, the display 121 may also be used as the operation interface 122 capable of inputting information through a touch of a user. To this end, the display 121 may be configured with a touch-sensitive display controller or other various input and output controllers. As an example, the touch recognition display controller may provide an output interface and an input interface between the device and the user. The touch recognition display controller may transmit and receive electrical signals with the controller 160. Also, the touch recognition display controller may display a visual output to the user, and the visual output may include text, graphics, images, video, and a combination thereof.

The operation unit 122 of the user interface 120 may have a plurality of operation buttons (not shown) in order to transmit signals corresponding to the buttons to the controller 160. This operation interface 122 may be configured with a sensor, button, or switch structure capable of recognizing a touch or pressing operation of the user. In the present embodiment, the operation interface 122 can transmit a user's operation signal to the controller 160 in order to check or change various information which is displayed on the display 121 and related to the operation of the indoor positioning system 1.

The user interface 120 may be included in the above-described vehicle user interface module or may include the vehicle user interface. The display 121 may be included in an output module of the vehicle user interface module or may include an output module. Further, the operation interface 122 may be included in an input module of the vehicle user interface module or may include an input module.

The image input interface 130 can collect the images of the certain indoor space which are captured by the vehicle camera 130-1 of the first vehicle 200. Then, the image input interface 130 can transmit the collected images and the image information of the images to the controller 160.

The map processor 140 can perform learning together with the controller 160 or receive the learning result from the controller 160. In the present embodiment, the map processor 140 may be disposed outside the controller 160 as shown in FIG. 3 or may be disposed inside the controller 160 and operate like the controller 160. The map processer 140 may be disposed inside the server 300 shown in FIG. 2. The map processor 140 will be described in detail with reference to FIG. 10.

The memory 150 that stores therein various information required for the indoor positioning system 1 may include a volatile or a non-volatile storage medium. For example, the memory 150 can store therein map data and map information data of an indoor map of a certain indoor space. At this time, the map data of the indoor map may indicate map data. The map information data of the indoor map may indicate at least one of information on a camera of a vehicle that has pre-created the indoor map, camera information by manufacturer, and parameters for matching the reference image with the image captured in a vehicle that enters the certain indoor space. Further, the memory 150 may store therein a deep neural model that was pre-trained for extracting image features and matching the reference image with the acquired image.

Here, the memory 150 may include a magnetic storage media or a flash storage media. However, the present disclosure is not limited thereto. The memory 150 may include a built-in memory and/or an external memory, and may include a storage, for example, a volatile memory such as a DRAM, an SRAM, or an SDRAM, a non-volatile memory such as a one time programmable ROM (OTPROM), a PROM, an EPROM, an EEPROM, a mask ROM, a flash ROM, a NAND flash memory, or a NOR flash memory, a flash drive such as an SSD, a compact flash (CF) card, an SD card, a Micro-SD card, a Mini-SD card, an Xd card, or a memory stick, or a storage device such as an HDD.

When the first vehicle 200 enters a certain indoor space, the controller 160 determines whether or not the indoor map of the certain indoor space is pre-created. When the indoor map of the certain indoor space is pre-created, map data and map information data of the pre-created indoor map can be acquired. At this time, the controller 160 can receive the map data and the map information data from the server 300. The controller 160 can store the received map data and the received map information data in the memory 150 and perform the image matching and the indoor positioning based on the map data and the map information data. In other words, the controller 160 can acquire images of the certain indoor space using the vehicle camera 130-1 and match the image information of the pre-created indoor map with the acquired image information based on the map data and the map information data of the certain indoor space that the first vehicle 200 enters. At this time, the controller 160 can match the image information of the pre-created indoor map with the acquired image information based on the reference image captured by the indoor space camera 110-1. Further, the controller 160 can perform the indoor positioning of the certain indoor space based on the matching result.

The controller 160 serving as a central processor can control the overall operation of the indoor positioning system 1 by driving the control software in the memory 150. The controller 160 may include any type of device capable of processing data, such as a processor. Here, the term "processor" may refer to a data processing device built in hardware, which includes physically structured circuits in order to perform functions represented as a code or command present in a program. Examples of the data processing device built in hardware may include microprocessors, central processing units (CPUs), processor cores, multiprocessors, application-specific integrated circuits (ASICs), digital signal processors (DSPs), digital signal processing devices (DSPDs), programmable logic devices (PLDs), processors, controllers, micro-controllers, and field programmable gate array (FPGA), but the present disclosure is not limited thereto.

In the present embodiment, the controller 160 can perform machine learning such as deep learning for the image matching of the indoor positioning system 1 so that the indoor positioning system 1 can perform optimal indoor positioning. The memory 150 can store therein, for example, data used for the machine learning or result data.

Deep learning, which is a subfield of machine learning, enables data-based learning through multiple layers. Deep learning may represent a set of machine learning algorithms that extract core data from a plurality of data sets as the number of layers increases.

Deep learning structures may include an artificial neural network (ANN). For example, the deep learning structure may include a deep neural network (DNN), such as a convolutional neural network (CNN), a recurrent neural network (RNN), and a deep belief network (DBN). The deep learning structure according to the present embodiment may use various structures well known in the art. For example, the deep learning structure according to the present disclosure may include a CNN, a RNN, and a DBN. RNN is widely used in natural language processing and may configure an artificial neural network structure by building up layers at each instant in a structure that is effective for processing time-series data which vary with time. A DBN may include a deep learning structure formed by stacking up multiple layers of restricted Boltzmann machines (RBM), which is a deep learning scheme. When a predetermined number of layers are constructed by repetition of RBM learning, the DBN having the predetermined number of layers may be constructed. A CNN includes a model mimicking a human brain function, built under the assumption that when a person recognizes an object, the brain extracts the most basic features of the object and recognizes the object based on the results of complex processing in the brain.

Meanwhile, learning of an artificial neural network may be performed by adjusting a weight of a connection line (also adjusting a bias value, if necessary) between nodes so that a desired output is achieved with regard to a given input. Furthermore, the artificial neural network may continuously update the weight values through training. Furthermore, a method of back propagation, for example, may be used in the learning of the artificial neural network.

In other words, an artificial neural network can be installed in the indoor positioning system 1. In other words, the controller 160 may include the artificial neural network, for example, a deep neutral network (DNN) such as a CNN, RNN, or DBN. Therefore, the controller 160 can learn the deep neural network for the image matching, for example, of the indoor positioning system 1. As a machine learning method for such an artificial neural network, both unsupervised learning and supervised learning may be used. The controller 160 may control so as to update an artificial neural network structure after learning according to a setting.

In this embodiment, parameters for pre-trained deep neural network may be collected. At this time, the parameters for the deep neutral network learning may include an image of a certain indoor space, information on the vehicle camera 130-1, camera information by manufacturer, data for matching reference image information with the image of the certain indoor space captured in the vehicle that enters, for example, the certain indoor space. However, in the present embodiment, the parameters for deep neural network learning are not limited thereto. In the present embodiment, data used by an actual user may be collected in order to refine the learning model. In other words, in the present embodiment, the user can input the user data through, for example, the communicator 110 or the user interface 120. In the present embodiment, when the user data is received from the user, input data may be stored in the server and/or the memory regardless of the result of the learning model. In other words, in the present embodiment, the indoor positioning system 1 can store, when a vehicle enters a certain indoor space, data for image matching and indoor positioning in the server to form big data, and perform deep learning at the server to update and refine the related parameters in the indoor positioning system 1. In the present embodiment, the parameters can be updated by performing the deep learning at the indoor positioning apparatus 100 or at the edge of the vehicle. In other words, in the present embodiment, the deep learning parameters under laboratory conditions are applied at an initial setting of the indoor positioning system or at a time of launching the vehicle, and can be updated using the data accumulated as the user drives the vehicle, in other words, as the user performs the indoor positioning. Therefore, in the present embodiment, the collected data can be labeled to obtain a result of the supervised learning and can be stored in the memory 150 of the indoor positioning system to complete an evolving algorithm. In other words, the indoor positioning system 1 can collect data for indoor positioning, produce a learning data set, and train with the learning data set using a machine learning algorithm in order to determine a learned model. Then, the indoor positioning system 1 can collect data used by actual users, and retrain at the server with the data to produce a relearned model. Therefore, in the present embodiment, even after data is determined as a learned model, data may be continuously collected and learned by applying a machine learning model, and the performance may be improved by the learned model.

Figure 10:
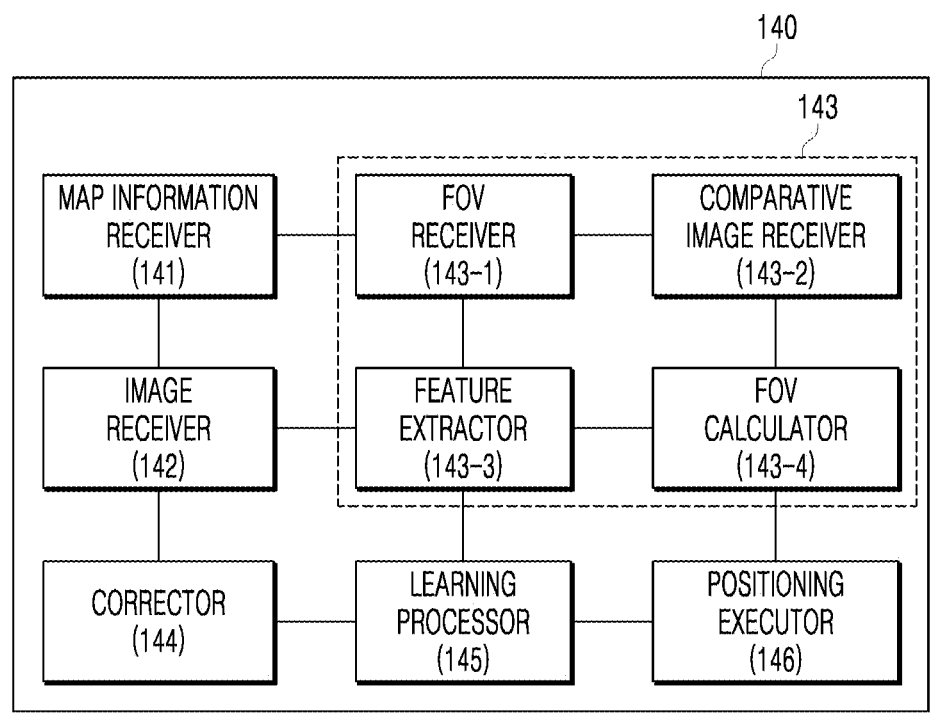
FIG. 10 is a schematic block diagram for explaining a map processor of the indoor positioning system.

FIG. 10 is a schematic block diagram for explaining the map processor of the indoor positioning system according to an embodiment of the present disclosure. In the following description, the same description as that in FIGS. 1 to 9 will be omitted.

Referring to FIG. 10, the map processor 140 may include a map information receiver 141, an image receiver 142, a matching executor 143, a corrector 144, a learning processor 145, and a positioning executor 146.

The map information receiver 141 can determine, when the first vehicle 200 enters a certain indoor space, whether or not an indoor map of the certain indoor space is pre-created using the communicator 110. When it is determined that the indoor map of the certain indoor space is pre-created, the map information receiver 141 can acquire map data and map information data of the pre-created indoor map. At this time, the map information data may include at least one of information on a camera of a vehicle that has pre-created the indoor map, camera information by manufacturer, and parameters for matching a reference image with a comparative image that is an image of the certain indoor space captured in the first vehicle 200 that enters the certain indoor space. For example, the map information data may include information on a camera of the second vehicle 200-1 (specification information such as resolution and FOV), camera information by manufacturer (specification information such as resolution and FOV), reference image information (all information capable of implementing an image) of the second vehicle 200-1 captured by the indoor space camera 110-1, and parameters (such as features) for matching the reference image of the second vehicle 200-1 with the image captured by the first vehicle 200.

In the case of image-based SLAM, the features (points and lines) of the image can be used. At this time, if there is a camera information difference between the camera of the second vehicle 200-1 which has created the indoor map of the certain inner space and the camera of the first vehicle 200 that enters the certain indoor space to perform the positioning, an image input difference may be generated.

Particularly in the present embodiment, if there is a difference between the FOV value of the camera of the second vehicle 200-1 and the FOV value of the camera of the first vehicle 200, the accuracy of the SLAM may deteriorate due to the image input difference and thus, a process of matching the FOV values is required. Here, the FOV may indicate a field of view, in other words, a visual field or a viewing angle. In general, the FOV value can be expressed by a vertical angle and a horizontal angle. As the value of the angle increases, an image of a wide visual field can be obtained. The distance between the camera and the subject is determined by the FOV value of the camera, and the distortion of a neighboring object or the amount of information that can be viewed at one time may vary depending on the FOV value. In other words, the object can be detected differently depending on the difference in the FOV value and thus, a procedure for calculating the FOV value and matching the images is required. Accordingly, in the present embodiment, when there is a pre-created indoor map of a certain indoor space, the FOV value of the camera of the vehicle that has created the indoor space is acquired, and the FOV value of the camera of the vehicle that enters the certain indoor space to perform the indoor positioning is acquired or calculated. Then, the camera of the vehicle that has created the indoor map and the camera of the vehicle that enters the certain indoor space are matched, which makes it possible to perform the accurate SLAM.

The image receiver 142 for acquiring an image of a certain indoor space can acquire images of the certain indoor space captured by the first vehicle 200 that enters the certain indoor space. At this time, the receiver 142 can distinguish and acquire an image captured immediately before the first vehicle 200 enters the certain indoor space, an image captured immediately after the first vehicle 200 enters the certain indoor space, and an image captured by the first vehicle 200 that has entered the certain indoor space. For example, in the present embodiment, the position of the first vehicle 200 is measured immediately before the first vehicle 200 enters the certain indoor space using a GPS, so that an image in an outdoor space where the position measurement is relatively accurate can be acquired. Further, in the present embodiment, immediately after the first vehicle 200 enters the certain indoor space, the image can be acquired at a position closest to the position where the reference image was captured (a position within a reference distance) so that the accurate matching with the reference image captured by the second vehicle 200-1 can be performed.

The matching executor 143 can match the image information of the pre-created indoor map with the image information acquired by the image receiver 142 based on the map data and the map information data of the certain indoor space acquired by the map information receiver 141.

In the present embodiment, the matching executor 143 includes an FOV receiver 143-1, a comparative image receiver 143-2, a feature extractor 143-3, and an FOV calculator 143-4, and can perform the image matching. The matching executor 143 can determine whether or not the information on the camera of the first vehicle 200 is included in the map information data of the certain indoor space acquired by the map information receiver 141. Further, the matching executor 143 can acquire or calculate the FOV value depending on whether or not the information on the camera is included in the map information data.

The FOV receiver 143-1 can acquire, when the information on the camera of the first vehicle 200 is included in the acquired map information data, the FOV value of the acquired image. In other words, the FOV receiver 143-1 can acquire the FOV value of the camera of the first vehicle 200 from, for example, the map information data from the server 300 of the indoor positioning system 1 or the control server for managing the certain indoor space. At this time, if the information on the camera is included in the map information data, the cameras may be the same camera or the cameras of the same manufacturer, and may be one of the cameras stored to have the same FOV value.

The comparative image receiver 143-2 can acquire, when the information on the camera of the first vehicle 200 is not included in the acquired map information data, the comparative image captured at a position corresponding to the position where the reference image of the pre-created indoor map was captured. In other words, the comparative image receiver 143-2 can acquire an image of the certain indoor space captured at a position closest to the position where the reference image of the certain indoor space (for example, a position within a reference distance) was captured by the second vehicle 200-1. At this time, in the present embodiment, the image captured immediately after the second vehicle 200-1 enters the certain indoor space to create the indoor map can be set as the reference image captured by the second vehicle 200-1. Further, the image captured immediately after the first vehicle 200 enters the certain indoor space to perform the indoor positioning can be set as the comparative image captured by the first vehicle 200.

In the present embodiment, an indoor space camera 110-1 is disposed in a certain indoor space to capture images of vehicles that enter the certain indoor space. Then, the indoor space camera 110-1 recognizes the license plates from the captured images to facilitate capturing the comparative image at a position at which the sizes of the license plates are the same.

Figure 11:
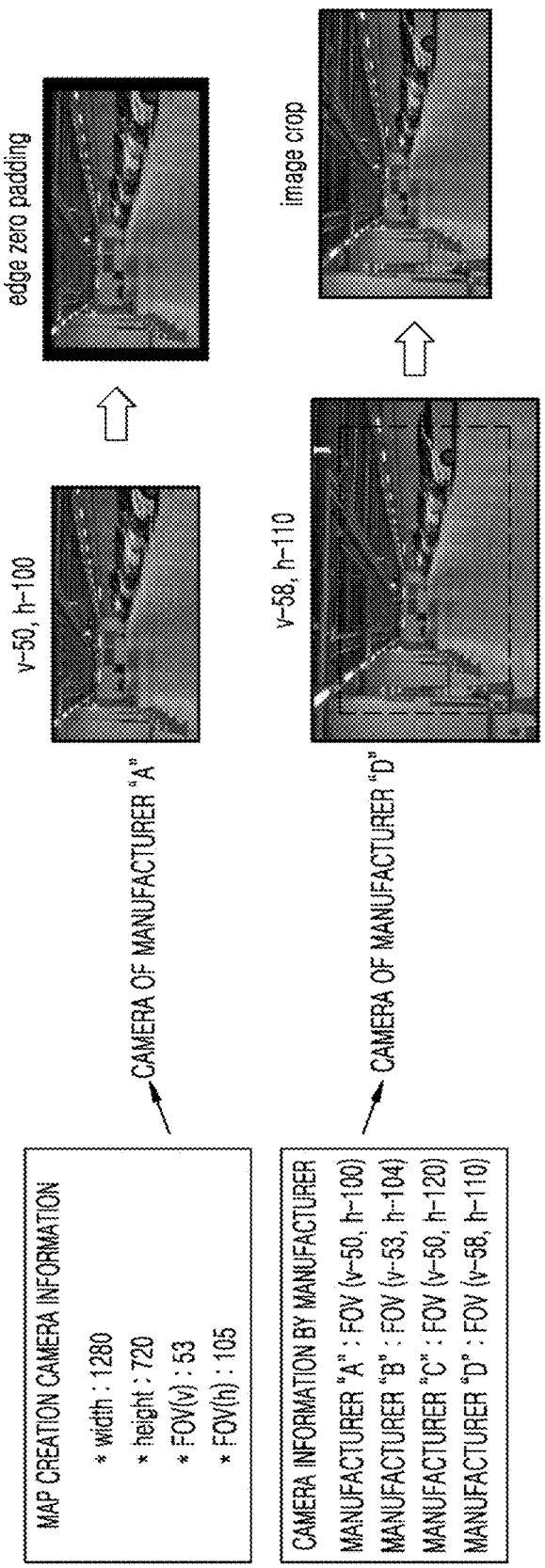
FIG. 11 illustrates an example for explaining a reference image generation of the indoor positioning system.

FIG. 11 illustrates an example for explaining a reference image generation in the indoor positioning system according to an embodiment of the present disclosure. Referring to FIG. 11, the indoor space camera 110-1 is disposed in a certain indoor space. In the present embodiment, the indoor space camera 110-1 can acquire a front side image of a vehicle that enters the certain indoor space. For example, when the certain indoor space is an indoor parking lot, a camera for recognizing a license plate of a vehicle may be disposed at the entrance of the indoor parking lot. In other words, the indoor space camera 110-1 can be implemented as a camera for recognizing a license plate, but is not limited thereto.

In the present embodiment, license plate images A and B captured when the second vehicle 200-1 enters the certain indoor space to create the indoor map can be stored. Further, in the present embodiment, license plate images A' and B' captured by the indoor space camera 110-1 when the first vehicle 200 enters the certain indoor space to perform the indoor positioning can be acquired. Moreover, in the present embodiment, the size of the license plate detected from the captured license plate images A and B of the second vehicle 200-1 can be compared with the size of the license plate detected from the captured license plate images A' and B' of the first vehicle 200.

In the present embodiment, when the size of the license plate at the position where the reference image was captured by the second vehicle 200-1 is the same as or similar to the size of the license plate of the first vehicle 200 within the reference value, it is possible to acquire a comparative image for image matching from the vehicle camera 130-1.

The feature extractor 143-3 can extract and match features of the reference image of the pre-created indoor map and the features of the comparative image acquired by the comparative image receiver 143-2 using the image feature extraction algorithm. For example, the features of the reference image and the features of the comparative image can be extracted using the image feature extraction algorithm such as surf or sift, and the respective features can be matched. Since extracting and matching image features are already known, detailed descriptions thereof will be omitted.

The FOV calculator 143-4 can obtain a conversion formula for converting a feature point coordinate system of the reference image of the pre-created indoor map to a feature point coordinate system of the comparative image acquired by the comparative receiver 143-2. Further, the FOV calculator 143-4 can calculate an FOV value of the comparative image acquired by the comparative receiver 143-2 based on the obtained conversion formula. At this time, the FOV calculator 143-4 can obtain the conversion formula by transform matrix estimation using image feature matching. Since this is already known, a detailed description thereof will be omitted.

The matching executor 143 can match the reference image with the comparative image acquired by the first vehicle 200 using the deep neural network model that was pre-trained for the image matching. At this time, the deep neural network model may be a learning model that was trained to match the reference image and the acquired comparative image while using the parameters of the reference image and the parameters of the comparative image as input data. In other words, the matching executor 143 can obtain a domain conversion formula of the comparative image by projecting on the map domain the matching result of the reference image and the comparative image obtained using the deep neural network model that was pre-trained for the image matching. At this time, in the present embodiment, if a graphics processing unit (GPU) module is installed in the vehicle camera 130-1, the deep learning can be performed in the vehicle camera 130-1.

The corrector 144 can correct, when information on the camera of the first vehicle 200 (FOV value) is included in the map information data, the image captured by the first vehicle 200 to correspond to the image captured by the second vehicle 200-1 based on the FOV value obtained by the FOV receiver 143-1.

The corrector 144 can correct, when the information on the camera of the first vehicle 200 (FOV value) is not included in the map information data, the image captured by the first vehicle 200 to correspond to the image captured by the second vehicle 200-1 based on the FOV value obtained by the FOV calculator 143-4. In other words, the corrector 144 can match the image information of the pre-created indoor map with the image information acquired by the receiver 142, and then correct the acquired image to correspond to the image of the pre-created indoor map based on the FOV value of the acquired image. In other words, the corrector 144 can correct the image captured by the first vehicle 200 to correspond to the image captured by the second vehicle 200-1 based on the FOV value of the image of the first vehicle 200 which was calculated by matching the image information of the second vehicle 200-1 with the image information of the first vehicle 200.

Figure 12:
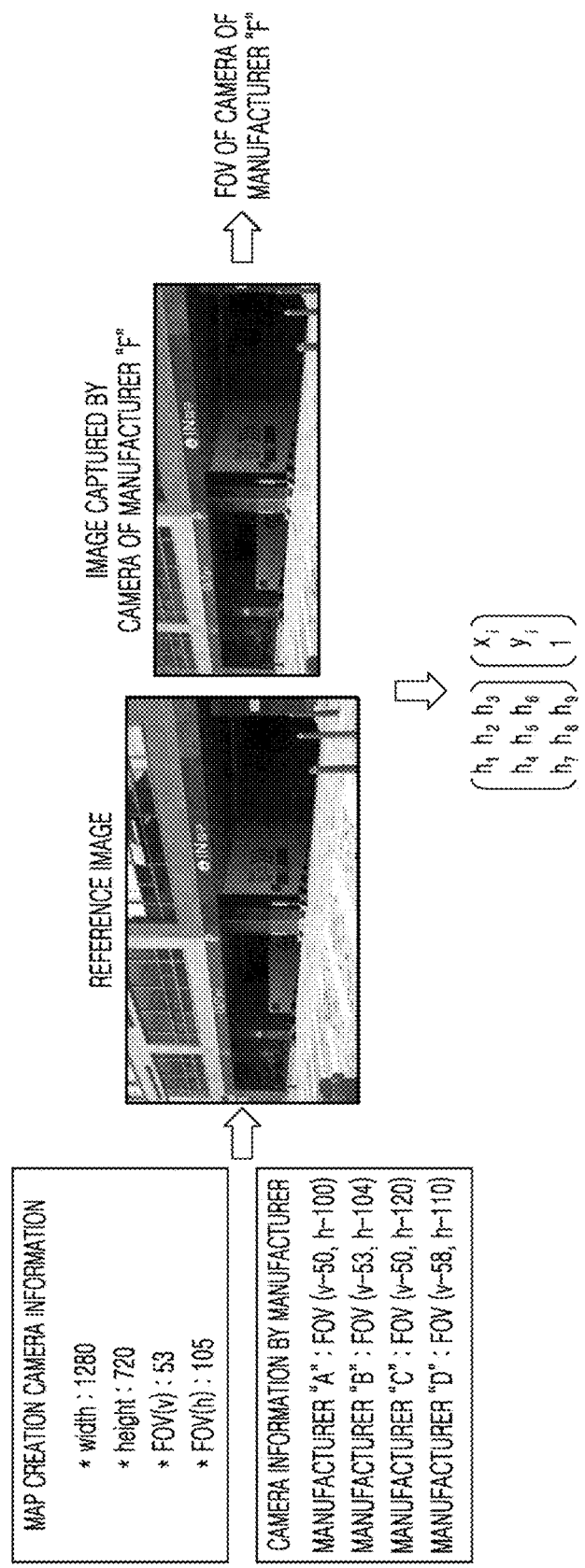
FIG. 12 explains image matching in the case where information on a camera is included in acquired map information data of the indoor positioning system.
Figure 13:
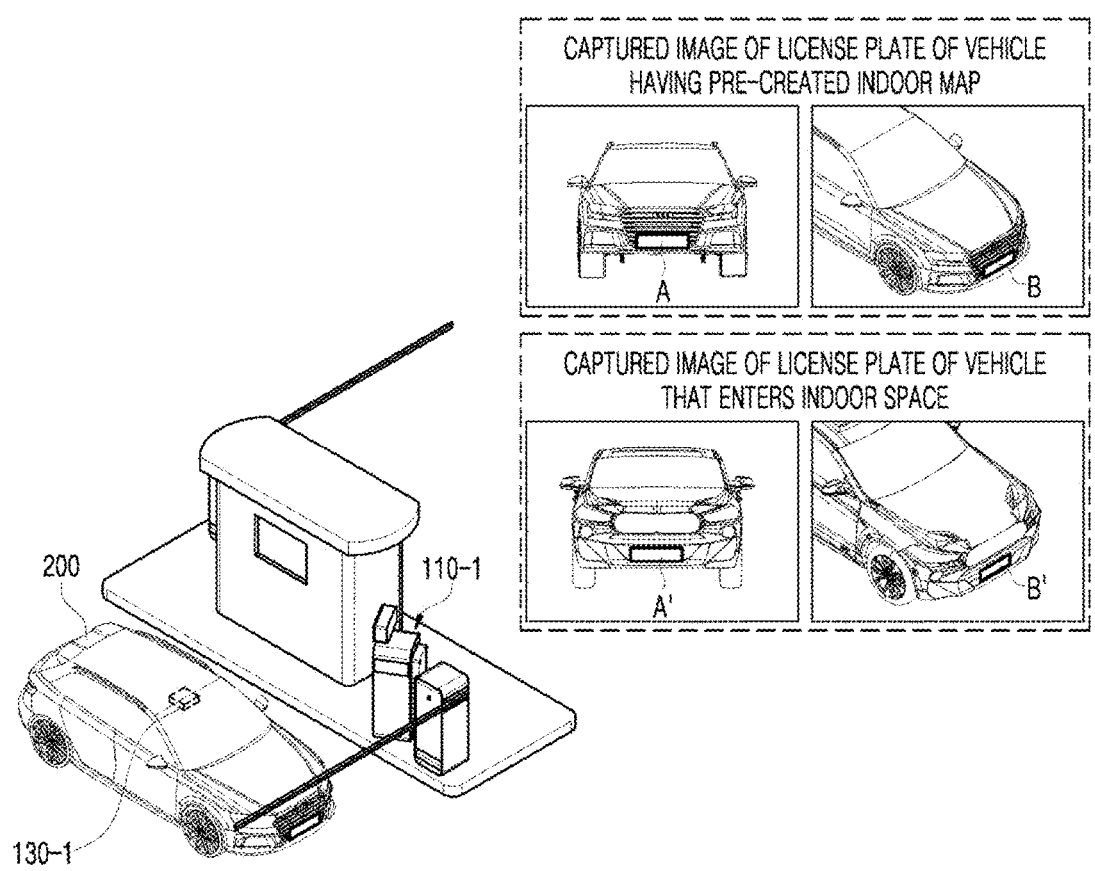
FIG. 13 explains image matching in the case where the information on the camera is not included in the acquired map information data of the indoor positioning system.

FIG. 12 illustrates an example for explaining an image matching in the case where information on a camera is included in acquired map information data of the indoor positioning system according to an embodiment of the present disclosure. FIG. 13 illustrates an example for explaining an image matching in the case where the information on the camera is not included in the acquired map information data of the indoor positioning system according to an embodiment of the present disclosure.

Referring to FIG. 12, in the present embodiment, when the information on the camera of the vehicle that enters a certain indoor space is included in the map information data of the pre-created indoor map of the certain indoor space, the image can be corrected by an FOV value acquired from the map information data.

In the present embodiment, information on a camera of the second vehicle 200-1 that has originally created the indoor map of the certain indoor space may include the resolution and the FOV value, and may be stored in the server 300 and/or the memory 150. At this time, the server 300 may be a control server for managing the certain indoor space or a server of the indoor positioning system 1. At this time, the stored information on the camera of the second vehicle 200-1 may include, for example, a resolution of 1280 in width and 720 in height and an FOV value of 105 in horizontal FOV and 53 in vertical FOV.

When a camera of the first vehicle 200 that enters the certain indoor space to perform indoor positioning is a product of manufacturer "A," the FOV receiver 143-1 can acquire the FOV value (v-50, h-100) from the map information data. In other words, the FOV value of the camera produced by manufacturer "A" is smaller than that of the camera of the second vehicle 200-1. Thus, the corrector 144 can perform edge zero padding on the image of the first vehicle 200 in accordance with the FOV value (v-53, h-105) of the camera of the second vehicle 200-1. In other words, the corrector 144 can adjust the image size of the first vehicle 200 to the image size of the second vehicle 200-1 by performing the edge zero padding. Here, the edge zero padding is a process of controlling the image size (width/height) by changing a hyper-parameter and generating an image filled with zeros in edges thereof.

When the camera of the first vehicle 200 that enters a certain indoor space to perform indoor positioning is a product of manufacturer "D," the FOV receiver 143-1 can acquire the FOV value (v-58, h-110) from the map information data. In other words, the FOV value of the camera produced by manufacturer "D" is greater than that of the camera of the second vehicle 200-1. Thus, the corrector 144 can crop the image of the first vehicle 200 in accordance with the FOV value (v-53, h-105) of the camera of the second vehicle 200-1. In other words, the corrector 144 can perform the image cropping to adjust the image size of the first vehicle 200 to the image size of the second vehicle 200-1.

At this time, in the present embodiment, the information on the camera of the first vehicle 200 (FOV value) and conversion information for calculating the FOV value of the camera of the first vehicle 200 can be updated in the server 300.

Referring to FIG. 13, in the present embodiment, when the information on the camera of the vehicle that enters the certain indoor space is not included in the map information of the pre-created indoor map of the certain indoor space, an FOV value can be calculated by acquiring a comparative image at a position corresponding to the position where the reference image of the pre-created indoor map was captured. For example, in the present embodiment, when the vehicle enters the certain indoor space, the reference image and the comparative image can be acquired. This is intended to acquire the reference image and the comparative image at the closest position, by specifying the position where the vehicles enter the certain indoor space.

When the camera of the first vehicle 200 that enters the certain indoor space to perform the indoor positioning is a product of manufacturer "F," the feature extractor 143-3 can extract the features of the reference image and the features of the comparative image using the image feature extraction algorithm. Further, the FOV calculator 143-4 can obtain a conversion formula for converting a feature point coordinate system of the reference image to a feature point coordinate system of the comparative image and calculate the FOV value (v-45, h-102) of the comparative image based on the conversion formula.

Further, the matching executor 143 can obtain the conversion formula from the feature point coordinate system of the reference image to the feature point coordinate system of the comparative image and calculate the FOV value of the first vehicle 200 using the deep neural network model that was pre-trained to extract the image features and to match the reference image with the comparative image.

In the present embodiment, the domain conversion formula for calculating the FOV value of the camera of the first vehicle 200 can be updated in the server 300.

Figure 14:
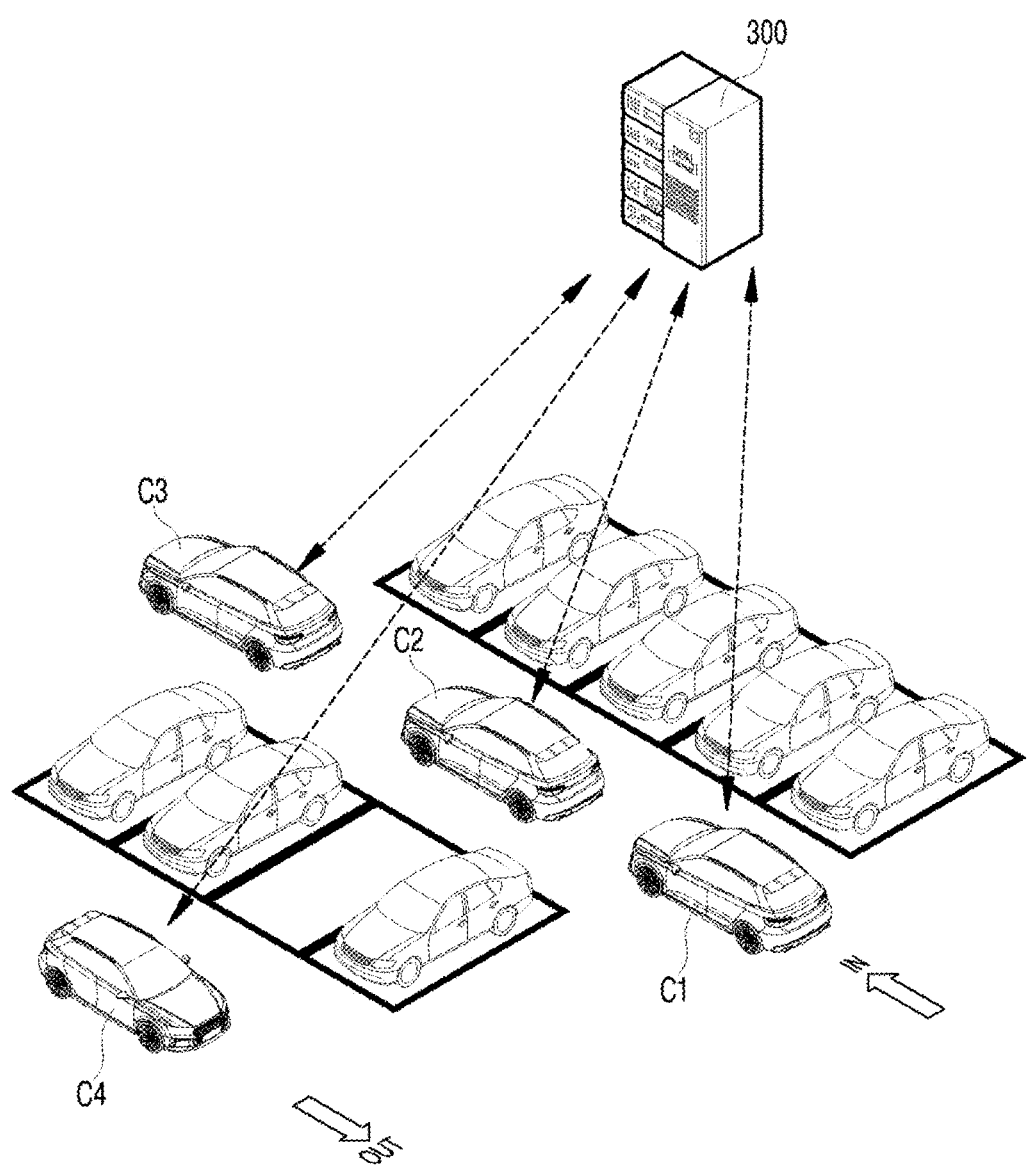
FIG. 14 explains an indoor position sharing environment of the indoor positioning system.

FIG. 14 illustrates an example for explaining an indoor position sharing environment of the indoor positioning system according to an embodiment of the present disclosure. Hereinbelow, description overlapping with that of FIG. 1 through FIG. 13 will be omitted.

Referring to FIG. 14, in the present embodiment, the navigation can be facilitated in a certain indoor space (for example, an underground parking lot) based on indoor positioning information, so that the vehicle can efficiently move and park in the certain indoor space. In other words, the server 300 can recognize position information of one or more vehicles in the certain indoor space based on the indoor positioning information generated for the certain indoor space. For example, in the present embodiment, the server 300 can receive position information from vehicle 1 (C1), vehicle 2 (C2), and vehicle 3 (C3) which are in an entering direction of the certain indoor space, and vehicle 4 (C4) which is in an exiting direction of the certain indoor space, and share the position information with the vehicles. Further, the server 300 can share information on empty parking spaces in real time by, for example, using license plate recognition of the vehicles which have entered the certain indoor space or exited the certain indoor space. Further, the server 300 can provide a moving path so that the vehicles in the certain indoor space can efficiently move to empty parking spaces.

Figure 15:
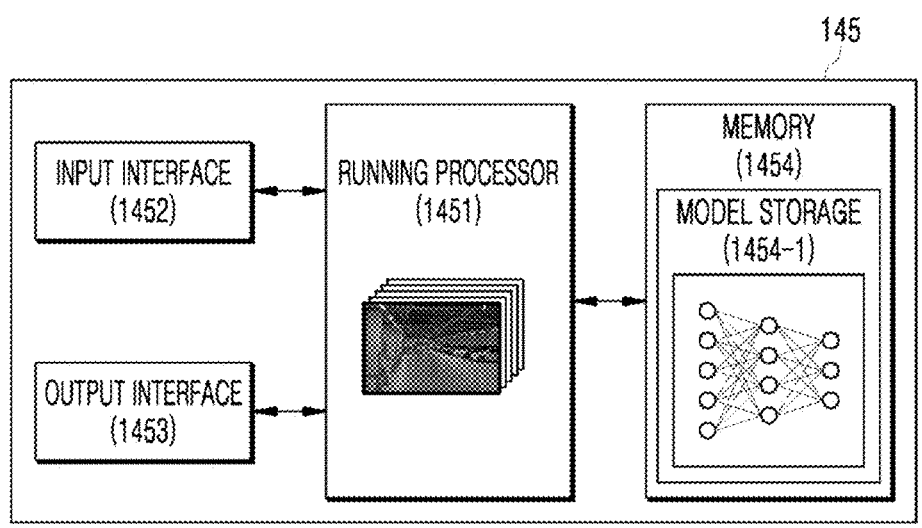
FIG. 15 is a schematic block diagram for explaining a learning processor.

FIG. 15 is a schematic block diagram for explaining a learning processor according to an embodiment of the present disclosure. Hereinbelow, description overlapping with that of FIG. 1 through FIG. 14 will be omitted.

Referring to FIG. 15, in the present embodiment, the learning processor 145 may include a learning processor 1451, an input interface 1452, an output interface 1453, and a learning memory 1454.

The learning processor 145 may indicate a device, a system, or a server that trains an artificial neural network using a machine learning algorithm or uses the trained artificial neural network. Here, the learning processor 145 includes a plurality of servers, and thus can perform distributed processing and can be defined by the 5G network. At this time, the learning processor 145, as a part of the indoor positioning system, can perform at least a part of the AI processing.

The input interface 1452 can receive data for image matching and data for indoor positioning, for example, as input data. For example, the input data may include data on information on a camera of a vehicle that has pre-created an indoor map, data on camera information by manufacturer, and parameters for matching a reference image with an image of a certain indoor space captured by a vehicle that enters the certain indoor space.

The learning processor 1451 can apply the received input data to a learning model for extracting image matching data. The learning model may include, for example, a deep neural network model that is trained to match the reference image with the acquired comparative image while using, for example, parameters of the reference image and parameters of the acquired comparative image as input data. The learning processor 1451 may train the artificial neural network using the training data. The learning model may be used in a state of being mounted on the AI server (20 of FIG. 1) of the artificial neural network, or may be used in a state of being mounted on the external device.

The output interface 1453 can output data for matching the reference image with the comparative image from the learning model to perform indoor positioning. In the present embodiment, an FOV value of the image of the vehicle that enters the certain indoor space to perform the indoor positioning, in other words, the first vehicle 200, can be output based on the matching result.

The learning memory 1454 may include a model storage 1454-1. The model storage 1454-1 can store a model (or artificial neural network) that is being trained or was trained by the learning processor 1451. The learning model may be implemented as hardware, software, or a combination of hardware and software. When a portion or the entirety of the learning model is implemented as software, one or more instructions, which constitute the learning model, may be stored in the memory 1941.

Figure 16:
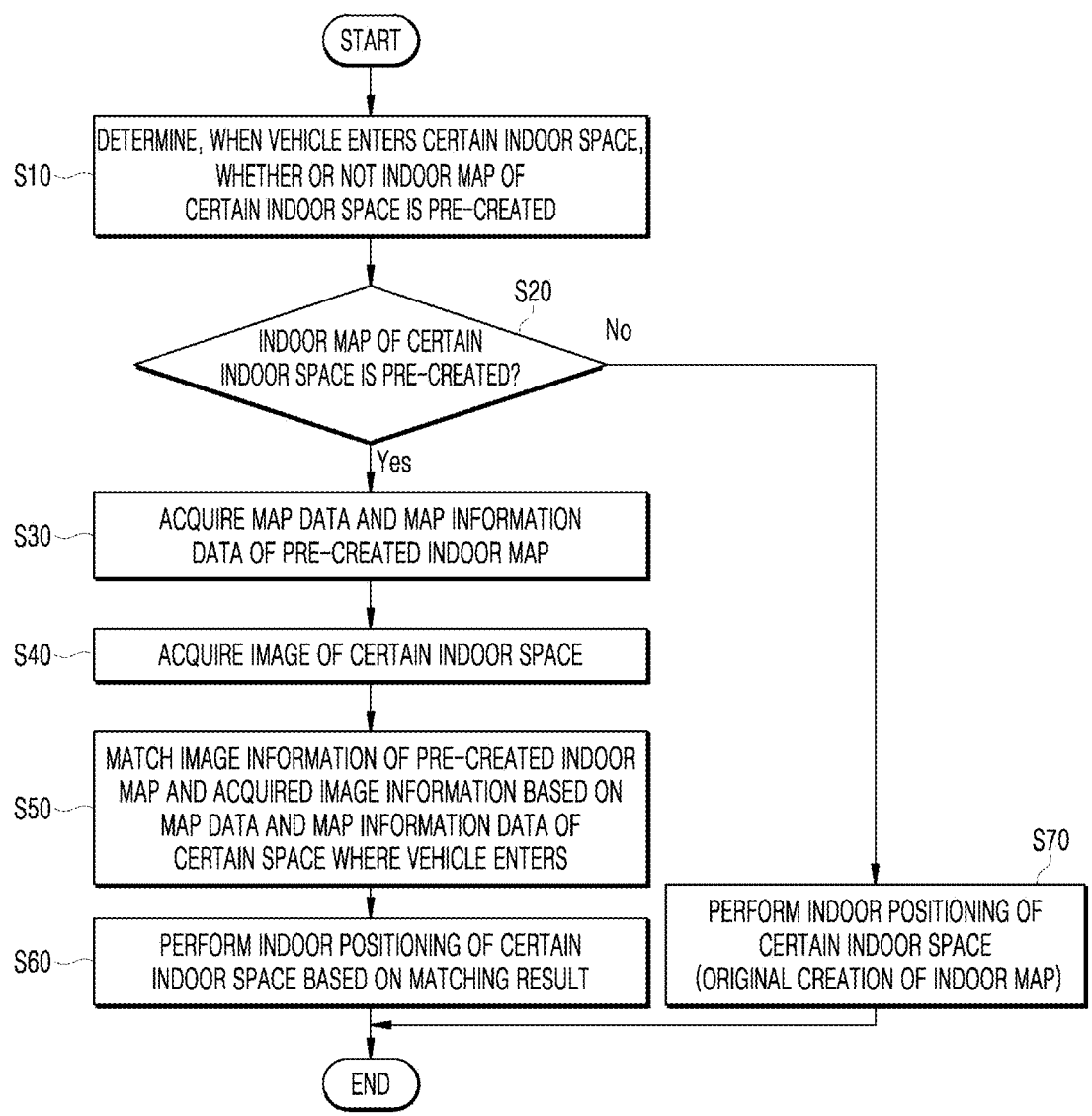
FIG. 16 is a flowchart for explaining a positioning method of the indoor positioning system.

FIG. 16 is a flowchart for explaining an indoor positioning method of the indoor positioning system according to an embodiment of the present disclosure. In the following description, the same description as that in FIGS. 1 to 15 will be omitted.

Referring to FIG. 16, in step S10, the indoor positioning system 1 determines, when a vehicle enters a certain indoor space, whether or not an indoor map of the certain indoor space is pre-created. When the first vehicle 200 enters the certain indoor space, the indoor positioning system 1 can determine, through the communicator 110, whether or not the indoor map of the certain indoor space is pre-created.

When the indoor map of the certain indoor space is pre-created (Yes in S20), the indoor positioning system 1 acquires map data and map information data of the pre-created indoor map, in step S30. The map information data may include at least one of information on a camera of a vehicle that has pre-created the indoor map, camera information by manufacturer, and parameters for matching a reference image with an image of the certain indoor space captured by a vehicle that enters the certain indoor space. For example, the map information data may include information on a camera of the second vehicle 200-1 (specification information such as resolution and FOV), camera information by manufacturer (specification information such as resolution and FOV), reference image information (all information capable of implementing an image) of the second vehicle 200-1 captured by the indoor space camera 110-1, and parameters (such as features) for matching the reference image of the second vehicle 200-1 with the image of the first vehicle 200.

In the case of image-based SLAM, the features (points and lines) can be used. If there is a camera information difference between the camera of the second vehicle 200-1 which has created the indoor map of the certain inner space and the camera of the first vehicle 200 that enters the certain indoor space to perform a positioning, an image input difference may be generated. Particularly in the present embodiment, when there is a difference between an FOV value of the camera of the second vehicle 200-1 and an FOV value of the camera of the first vehicle 200, the accuracy of the SLAM may deteriorate due to the image input difference and thus, a process of matching the FOV values is performed. Since the object can be detected differently depending on the difference in the FOV value, a process of calculating the FOV value to match the images is required. Accordingly, in the present embodiment, when there is a pre-created indoor map of a certain indoor space, the FOV value of the camera of the vehicle that has created the indoor map is acquired, and the FOV value of the camera of the vehicle that enters the certain indoor space to perform the indoor positioning is acquired or calculated. Then, the camera of the vehicle that has created the indoor map and the camera of the vehicle that enters the certain indoor space are matched, which makes it possible to perform the accurate SLAM.

In step S40, the indoor positioning system 1 acquires images of the certain indoor space. The indoor positioning system 1 can acquire the images captured by the first vehicle 200 that enters a certain indoor space. At this time, the indoor positioning system 1 can distinguish and acquire an image captured immediately before the first vehicle 200 enters the certain indoor space, an image captured immediately after the first vehicle 200 enters the certain indoor space, and an image captured by the first vehicle 200 that has entered the certain indoor space. For example, in the present embodiment, the position of the first vehicle 200 is measured immediately before the first vehicle 200 enters the certain indoor space using a GPS, so that the image in the outdoor space where the position measurement is relatively accurate can be acquired. Further, in the present embodiment, immediately after the first vehicle 200 enters the certain indoor space, the image can be acquired at a position closest to the position where the reference image was captured (within a reference distance) to perform the accurate matching with the reference image captured by the second vehicle 200-1.

In step S50, the indoor positioning system 1 matches the image information of the pre-created indoor map with the acquired image information based on the map data and the map information data of the certain indoor space where the vehicle enters. In the present embodiment, the indoor positioning system 1 can determine whether or not the information on the camera of the first vehicle 200 is included in the map information data of the certain indoor space acquired when the vehicle enters the certain indoor space. Further, the indoor positioning system 1 can acquire or calculate an FOV value depending on whether or not information on the camera of the first vehicle 200 is included in the map information data. Detailed description thereof will be provided with reference to FIG. 17.

In step S60, the indoor positioning system 1 performs the indoor positioning in the certain indoor space based on the matching result.

In the present embodiment, when the indoor map of the certain indoor space is not pre-created (No in S20), the indoor positioning system 1 performs the indoor positioning in the certain indoor space to create an original indoor map in step S70.

Figure 17:
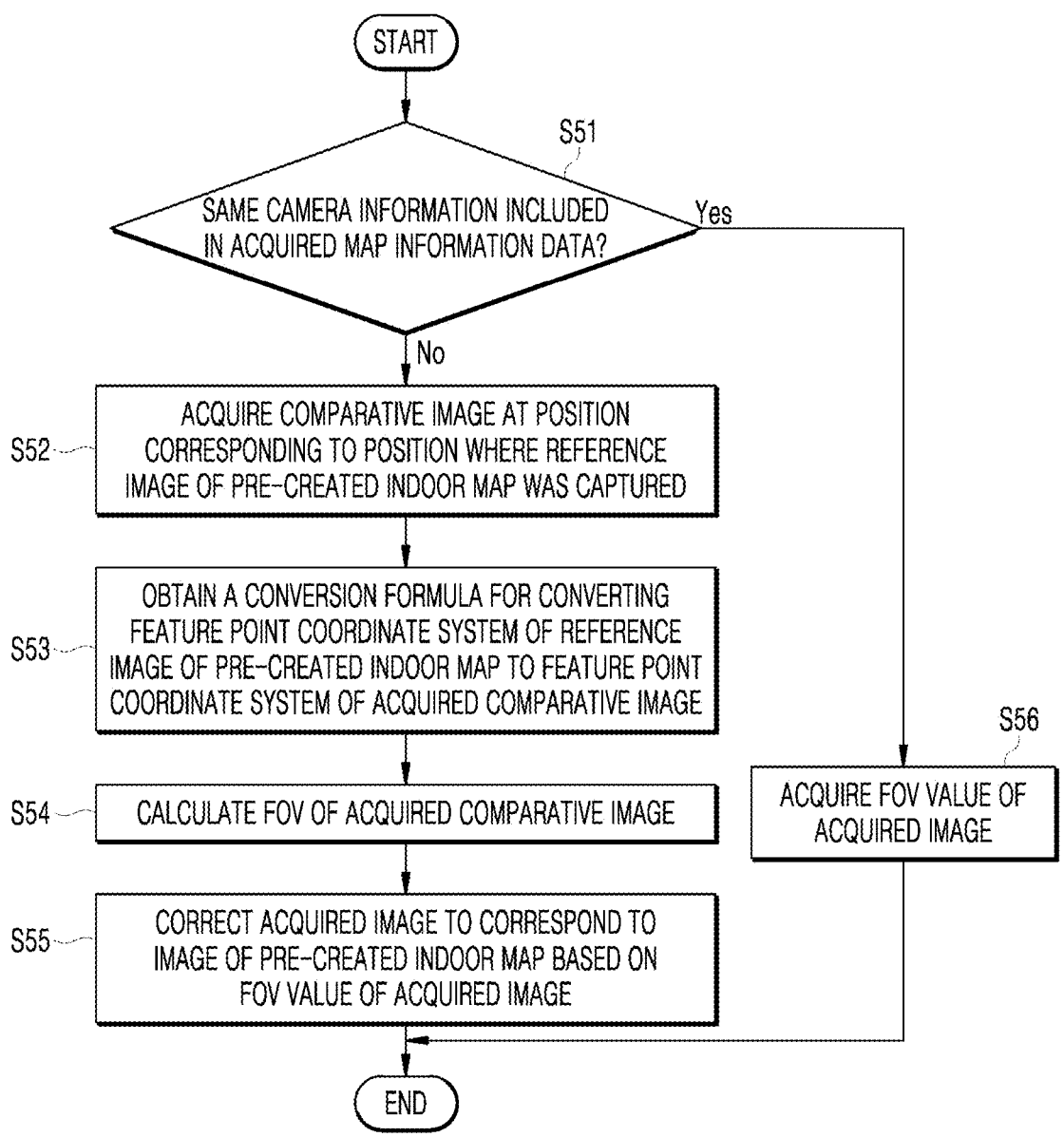
FIG. 17 is a flowchart for explaining an image matching method performed by an indoor positioning system depending on whether or not the information on the camera is included in the acquired map information data.

FIG. 17 is a flowchart for explaining an image matching method performed by the indoor positioning system according to an embodiment of the present disclosure depending on whether or not information on a camera is included in the acquired map information data. In the following description, the same description as that in FIGS. 1 to 16 will be omitted.

Referring to FIG. 17, in step S51, the indoor positioning system 1 determines whether or not the information on the camera of the vehicle that enters the certain indoor space is included in the acquired map information data.

When the information on the camera of the vehicle that enters the certain indoor space is not included in the acquired map information data (No in S51), the indoor positioning system 1 acquires, in step S52, a comparative image at a position corresponding to a position where a reference image of the pre-created indoor map was captured. In other words, the indoor positioning system 1 can acquire the image of the certain indoor space captured at a position closest to the position where the reference image of the certain indoor space was captured by the second vehicle 200-1 (for example, a position within a reference distance). At this time, in the present embodiment, the image captured immediately after the second vehicle 200-1 enters the certain indoor space to create the indoor map can be set as a reference image captured by the second vehicle 200-1. Further, the image captured immediately after the first vehicle 200 enters the certain indoor space to perform the indoor positioning can be set as a comparative image captured by the first vehicle 200. Further, in the present embodiment, the indoor space camera 110-1 is disposed in the certain indoor space to capture images of vehicles that enter the certain indoor space. Then, the indoor space camera 110-1 can recognize the license plates from the captured images so that the comparative image can be captured at a position where the sizes of the license plates are the same.

In the step S53, the indoor positioning system 1 obtains a conversion formula for converting a feature point coordinate system of the reference image of the pre-created indoor map to a feature point coordinate system of the acquired comparative image. For example, the indoor positioning system 1 can extract the features of the reference image and the features of the comparative image using an image feature extraction algorithm such as surf or sift, and the respective features can be matched.

In the step S54, the indoor positioning system 1 calculates an FOV value of the acquired comparative image. In other words, the indoor positioning system 1 can obtain a conversion formula for converting the feature point coordinate system of the reference image of the pre-created indoor map to the feature point coordinate system of the comparative image. Further, the indoor positioning system 1 can calculate the FOV value of the comparative value based on the obtained conversion formula. At this time, the indoor positioning system 1 can obtain the conversion formula by transform matrix estimation using image feature matching. Further, the indoor positioning system 1 can match the reference image of the second vehicle 200-1 with the comparative image of the first vehicle 200 using the deep neural network model that was pre-trained for the image matching. Therefore, the indoor positioning system 1 can obtain a domain conversion formula of the comparative image by projecting on the map domain the matching result of the reference image and the comparative image obtained using the deep neural network model that was pre-trained for the image matching.

In step S55, the indoor positioning system 1 corrects the acquired image to correspond to the image of the pre-created indoor map based on the FOV value of the acquired image. In other words, the indoor positioning system 1 can match the image information of the pre-created indoor map with the image information of the first vehicle 200, and then correct the image of the first vehicle 200 to correspond to the image of the second vehicle 200-1.

When the same camera information as that of the camera that enters the certain indoor space is included in the acquired map information data (Yes in S51), the indoor positioning system 1 acquires the FOV value of the acquired image from the map information data. In other words, the indoor positioning system 1 can acquire the FOV value of the camera of the first vehicle 200 from the map information data from the server 300 of the indoor positioning system 1 or the control server for managing the certain indoor space.

The above-described embodiments of the present disclosure can be implemented as a computer program that can be executed on a computer using various components, and the computer program can be stored in a computer-readable medium. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present disclosure (particularly in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

Operations constituting the method of the present disclosure may be performed in appropriate order unless explicitly described in terms of order or described to the contrary. The present disclosure is not necessarily limited to the order of operations given in the description. All examples described herein or the terms indicative thereof (such as "for example") used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations can be made depending on design conditions and factors within the scope of the appended claims or equivalents thereof.

Therefore, technical ideas of the present disclosure are not limited to the above-mentioned embodiments, and it is intended that not only the appended claims, but also all changes equivalent to claims, should be considered to fall within the scope of the present disclosure.

What is claimed is:

1. A method for positioning based on a SLAM map comprising:
   checking entry into an indoor space;
   checking presence of an indoor map of the indoor space in response to checking the entry;
   receiving map data and map information data of the indoor map in response to the presence of the indoor map of the indoor space;
   receiving the map information data including at least one of information on a camera of a device that has created the indoor map, or parameters for comparing a reference image with the acquired image of the indoor space;

checking presence of information on the device camera in the map information data;
acquiring a comparative image captured at a position corresponding to the position where the reference image is captured, in response to the checking the presence of the information on the device camera in the map information data;
extracting features of the reference image and features of the acquired comparative image;
obtaining a conversion formula for converting a feature point coordinate system of the reference image to a feature point coordinate system of the acquired comparative image;
calculating an FOV value of the acquired comparative image based on the conversion formula;
acquiring an image of the indoor space at a device camera;
comparing image information of the indoor map with the acquired image information of the indoor space based on the map data and the map information data of the indoor map; and
performing indoor localizing of the indoor space based on a result of the comparing.

2. The method of claim 1, further comprising:
acquiring a field of view (FOV) value of the acquired image.

3. The method of claim 1, further comprising, after the comparing the image information of the indoor map with the acquired image information:
correcting the acquired image to correspond to the image of the indoor map based on the FOV value of the acquired image.

4. A method for positioning based on a SLAM map comprising:
checking entry into an indoor space;
checking presence of an indoor map of the indoor space in response to checking the entry;
receiving map data and map information data of the indoor map in response to the presence of the indoor map of the indoor space;
receiving the map information data including at least one of information on a camera of a device that has created the indoor map, or parameters for comparing a reference image with the acquired image of the indoor space;
acquiring an image of the indoor space at a device camera;
checking presence of information on the device camera in the map information data;
acquiring a comparative image captured at a position corresponding to the position where the reference image is captured, in response to the checking the presence of the information on the device camera in the map information data;
matching the reference image with the acquired comparative image using a deep neural network model that is trained for image matching;
obtaining a domain conversion formula of the acquired comparative image by projecting on a map domain a result of the matching the reference image and the acquired comparative image using the deep neural network model that is trained for image matching;
calculating an FOV value of the acquired comparative image based on the conversion formula,
comparing image information of the indoor map with the acquired image information of the indoor space based on the map data and the map information data of the indoor map; and
performing indoor localizing of the indoor space based on a result of the comparing,
wherein the deep neural network model is a learning model that is trained for matching the reference image with the acquired comparative image while using parameters of the reference image and parameters of the acquired comparative image as input data.

5. An apparatus for positioning based on a SLAM map comprising:
a map information receiver configured to check presence of an indoor map of the indoor space in response to checking entry into the indoor space, and receive map data and map information data of the indoor map in response to the presence of the indoor map of the indoor space;
an image receiver configured to acquire an image of the indoor space at a device camera;
a matching executor configured to compare image information of the indoor map with the acquired image information of the indoor space based on the map data and the map information data of the indoor space; and
a positioning executor configured to execute indoor localizing of the indoor space based on a result of the comparing,
wherein the map information data includes at least one of information on a camera of a device that has created the indoor map, or parameters for comparing a reference image with the acquired image of the indoor space, and
wherein the matching executor further comprises:
a comparative image receiver configured to acquire a comparative image captured at a position corresponding to a position where the reference image is captured, in response to an absence of the information on the camera of the device in the map information data,
a feature extractor configured to extract features of the reference image and features of the acquired comparative image, and
an FOV calculator configured to obtain a conversion formula for converting a feature point coordinate system of the reference image to a feature point coordinate system of the acquired comparative image and calculate an FOV value of the acquired comparative image based on the conversion formula.

6. The apparatus of claim 5, further comprising: a corrector configured to correct, after the image information of the indoor map and the acquired image information are compared, the acquired image to correspond to the image of the indoor map based on the FOV value of the acquired image.

7. An apparatus for positioning based on a SLAM map comprising:
a map information receiver configured to check presence of an indoor map of the indoor space in response to checking entry into the indoor space, and receive map data and map information data of the indoor map in response to the presence of the indoor map of the indoor space;
an image receiver configured to acquire an image of the indoor space at a device camera;
a matching executor configured to compare image information of the indoor map with the acquired image information of the indoor space based on the map data and the map information data of the indoor space; and
a positioning executor configured to execute indoor localizing of the indoor space based on a result of the comparing, wherein the map information data includes at least one of information on a camera of a device that has created the indoor map, or parameters for comparing a reference image with the acquired image of the indoor space, wherein the matching executor further comprises:
- a comparative image receiver configured to acquire a comparative image captured at a position corresponding to a position where the reference image is captured, in response to an absence of the information on the camera of the device in the map information data wherein the matching executor is configured to match the reference image with the acquired comparative image using a deep neural network model that is trained for image matching; and wherein the matching executor further comprises:
- an FOV calculator configured to obtain a domain conversion formula of the acquired comparative image by projecting, on a map domain, a result of the matching the reference image with the acquired comparative image using the deep neural network model that is trained for image matching, and calculate an FOV value of the acquired comparative image based on the conversion formula, wherein the deep neural network model is a learning model that is trained for matching the reference image with the acquired comparative image while using parameters of the reference image and parameters of the acquired comparative image as input data.

\* \* \* \* \*